(12) United States Patent
Narasimhan

(10) Patent No.: US 10,997,549 B2
(45) Date of Patent: May 4, 2021

(54) ROUTING SYSTEM CONFIGURATIONS BASED ON VARIOUS INVENTORIES

(71) Applicant: PAYPAL, INC., San Jose, CA (US)

(72) Inventor: Srivathsan Narasimhan, Saratoga, CA (US)

(73) Assignee: PAYPAL, INC., San Jose, CA (US)

( * ) Notice: Subject to any disclaimer, the term of this patent is extended or adjusted under 35 U.S.C. 154(b) by 763 days.

(21) Appl. No.: 15/194,844

(22) Filed: Jun. 28, 2016

(65) Prior Publication Data

US 2017/0372257 A1 Dec. 28, 2017

(51) Int. Cl.
| | |
|---|---|
| G06Q 10/08 | (2012.01) |
| G06F 9/54 | (2006.01) |
| G06F 16/248 | (2019.01) |
| G06F 16/9535 | (2019.01) |

(52) U.S. Cl.
CPC .......... *G06Q 10/087* (2013.01); *G06F 9/543* (2013.01); *G06F 16/248* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 6,622,127 B1 | 9/2003 | Klots et al. | |
| 6,629,135 B1* | 9/2003 | Ross, Jr. | G06Q 30/06 709/218 |
| 7,177,825 B1* | 2/2007 | Borders | G06Q 10/0631 705/26.81 |
| 7,574,383 B1* | 8/2009 | Parasnis | G06Q 10/06315 705/28 |
| 8,407,110 B1 | 3/2013 | Joseph et al. | |
| 8,560,403 B2* | 10/2013 | Adstedt | G06Q 10/087 705/26.1 |
| 8,688,540 B1 | 4/2014 | Patel et al. | |
| 9,245,291 B1 | 1/2016 | Ballaro et al. | |
| 9,934,484 B2* | 4/2018 | Menipaz | G06Q 10/087 |
| 9,947,024 B1* | 4/2018 | Shariff | G06Q 30/0256 |
| 10,049,393 B1* | 8/2018 | Cearns | G06Q 30/0605 |
| 2002/0107861 A1* | 8/2002 | Glendinning | G06Q 30/02 |

(Continued)

OTHER PUBLICATIONS

C. Y. Wong, D. McFarlane, A. Ahmad Zaharudin and V. Agarwal, "The intelligent product driven supply chain," IEEE International Conference on Systems, Man and Cybernetics, Yasmine Hammamet, Tunisia, 2002, pp. 6 pp. vol. 4 (Year: 2002).*

*Primary Examiner* — Timothy Padot
*Assistant Examiner* — Darlene Garcia-Guerra
(74) *Attorney, Agent, or Firm* — Haynes and Boone, LLP

(57) ABSTRACT

Various systems, mediums, and methods may involve a routing system. For example, the routing system may determine a user request for an item, possibly generated by the user's device, such as a smartphone device. The routing system may search for the item with a lead inventory system associated with one or more networks. The routing system may identify that the lead inventory system is out or out of stock with respect to the requested item. The routing system may also route the user request to one or more stocked inventory systems, possibly holding the requested item in stock. As such, the routing system may identify at least one stocked inventory system capable of providing the requested item from the inventory.

20 Claims, 16 Drawing Sheets

(56) References Cited

U.S. PATENT DOCUMENTS

| | | | |
|---|---|---|---|
| 2002/0147656 A1* | 10/2002 | Tam | G06Q 30/02 705/26.41 |
| 2003/0074206 A1 | 4/2003 | Hoffman et al. | |
| 2003/0083961 A1* | 5/2003 | Bezos | G06Q 30/0633 705/26.8 |
| 2004/0111286 A1 | 6/2004 | Koenig et al. | |
| 2006/0095346 A1* | 5/2006 | Gambhir | G06Q 10/087 705/28 |
| 2007/0130059 A1* | 6/2007 | Lee | G06Q 30/08 705/37 |
| 2009/0164338 A1* | 6/2009 | Rothman | G06Q 30/02 705/26.1 |
| 2009/0204547 A1 | 8/2009 | Rowan | |
| 2012/0095879 A1 | 4/2012 | Wijaya et al. | |
| 2012/0130917 A1* | 5/2012 | Forsblom | G06Q 30/0282 705/347 |
| 2012/0203668 A1* | 8/2012 | Howard | G06Q 10/087 705/26.64 |
| 2013/0046609 A1* | 2/2013 | Grigg | G06Q 30/08 705/14.34 |
| 2013/0144754 A1 | 6/2013 | Moser | |
| 2013/0151381 A1 | 6/2013 | Klein | |
| 2013/0204894 A1* | 8/2013 | Faith | G06Q 99/00 707/769 |
| 2014/0006282 A1* | 1/2014 | Friedman | G06Q 20/12 705/44 |
| 2015/0046300 A1* | 2/2015 | Menipaz | G06Q 10/087 705/28 |
| 2015/0095113 A1 | 4/2015 | Richards-Boeff et al. | |
| 2015/0134488 A1* | 5/2015 | MacLaurin | G06Q 30/0639 705/26.62 |
| 2015/0142594 A1* | 5/2015 | Lutnick | G06Q 50/28 705/21 |
| 2015/0324884 A1 | 11/2015 | Ouimet | |
| 2015/0347947 A1* | 12/2015 | Bhojwani | G06F 16/9535 705/7.25 |
| 2016/0307151 A1 | 10/2016 | Grabovski et al. | |
| 2016/0328765 A1 | 11/2016 | Pang et al. | |
| 2017/0200191 A1* | 7/2017 | Tuteja | G06Q 30/0253 |

\* cited by examiner

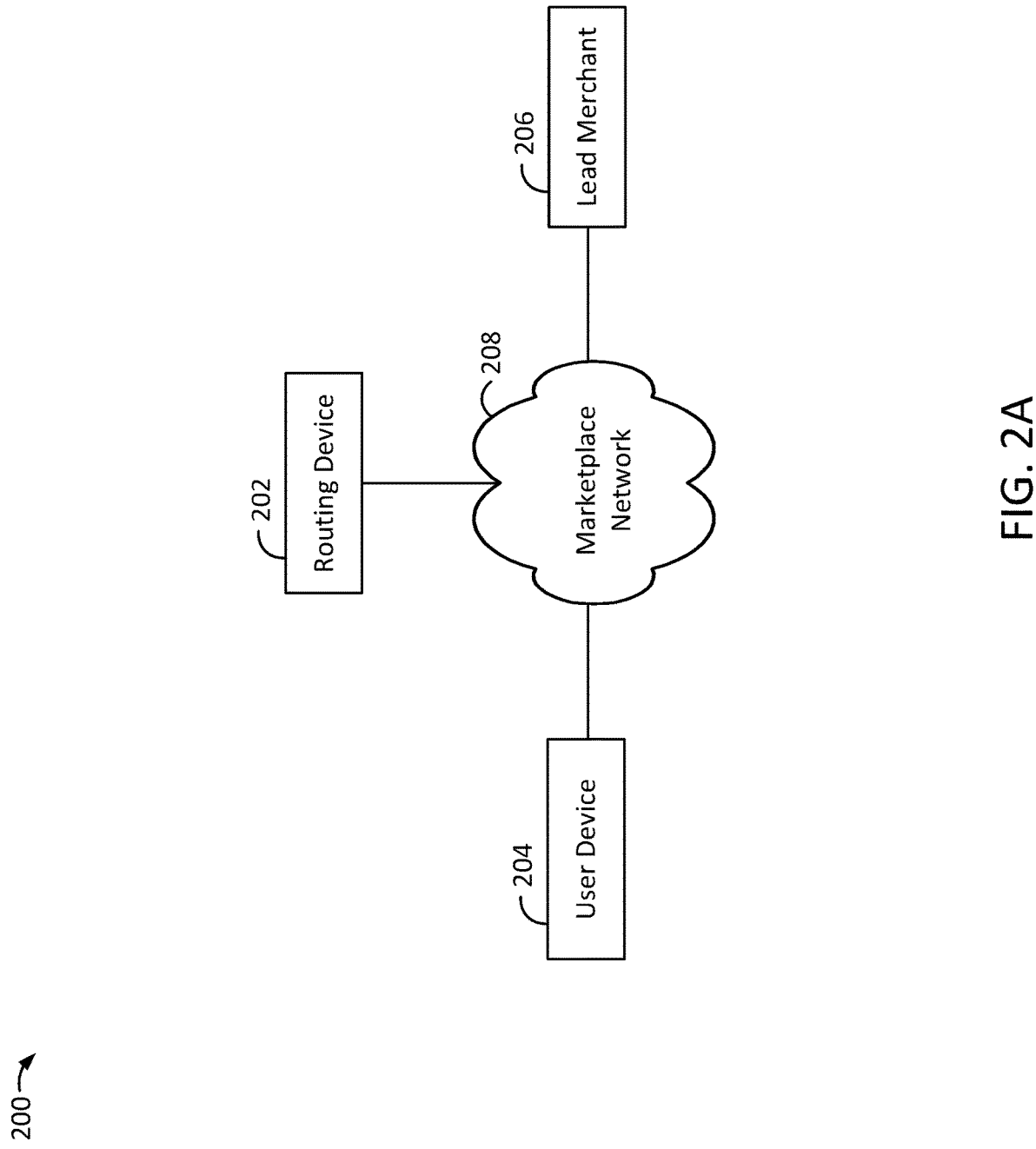

US 10,997,549 B2

ROUTING SYSTEM CONFIGURATIONS BASED ON VARIOUS INVENTORIES

BACKGROUND

Numerous search requests for items are generated throughout any given day. For example, some search requests may be for items identified from various networks, such as marketplace networks around the world. Yet, based on searching for a requested item, various merchant inventories associated with the merchants networks may indeed be out of stock with respect to the requested item. Yet further, in some instances, some merchant inventories may actually have the requested item in stock, but the search may be misdirected and/or the item may be improperly tagged or marked, such that the requested item is unrecognized by the inventory system. Instead, the inventory system may recognize and/or identify the requested item as a different item. In such instances, the user requesting the item is disappointed because she cannot find the requested item and she must continue searching for the item. Further, the merchant offering the item may lose a sale and/or a transaction and further, the merchant incurs additional losses from the requested item taking up space in the inventory.

As demonstrated in the scenario above, there may be various inefficiencies associated with searching and/or identifying requested items. In addition, these inefficiencies may be proportionally increased based on the volume of requests for items generated by numerous users throughout any given day. As such, there is much need for technological advancements in various aspects of computer technology in the realm of computer networks and particularly with systems associated with inventories.

BRIEF DESCRIPTION OF THE DRAWINGS

FIG. 2A illustrates an exemplary system with a routing device, according to an embodiment;

Figure 1:
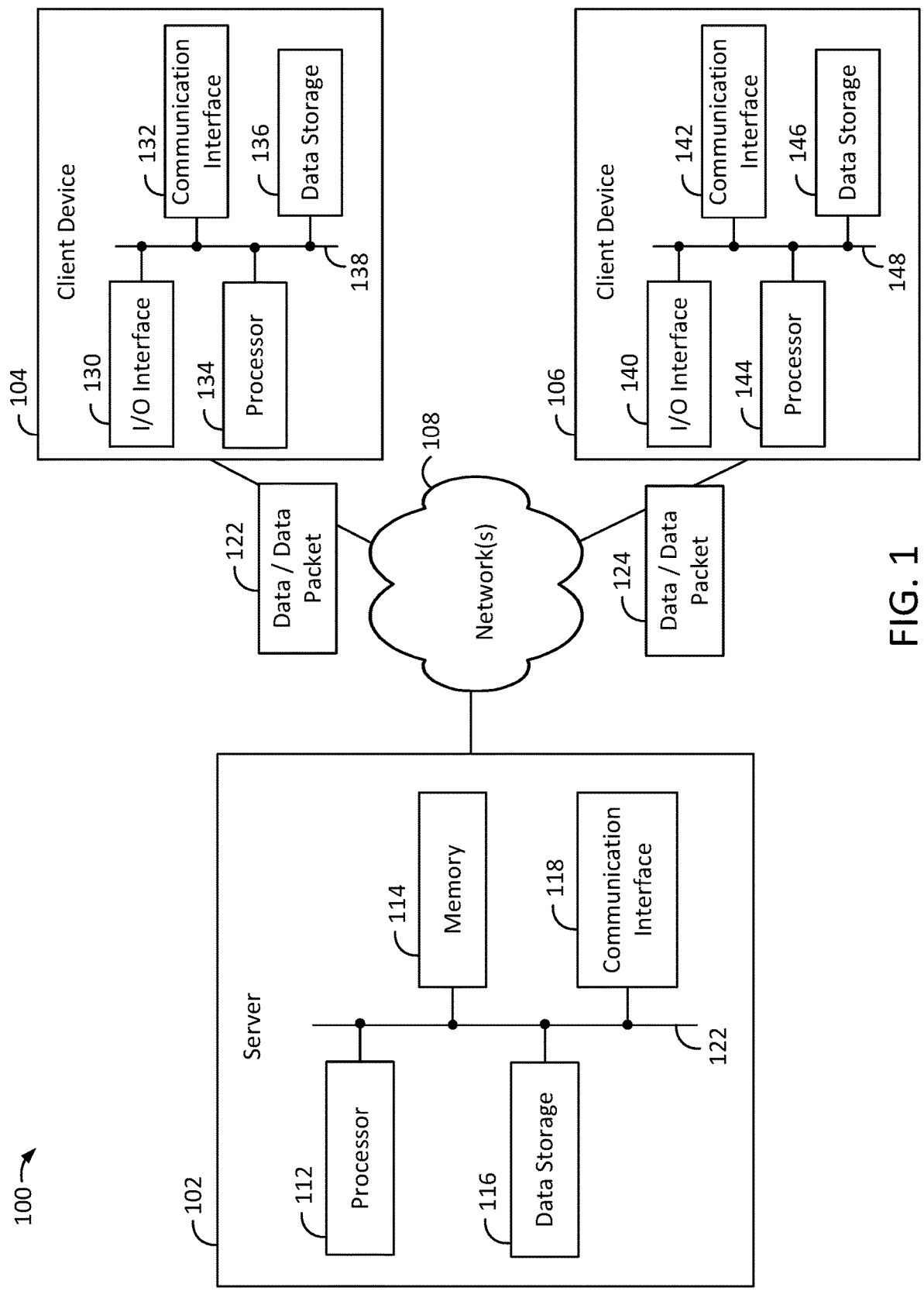
FIG. 1 is a block diagram of an exemplary system, according to an embodiment.

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

As described above, there may be various inefficiencies associated with searching and/or identifying requested by users. Yet further, there may be an increasing volume of requests for items generated by numerous users such that the inefficiencies may be proportionally increased. For example, consider a scenario where a user is searching for an item, such as a shawl. In some instances, the item may be a specific type shawl, such as a cashmere shawl with a paisley print, for example. As such, the user may search for the shawl item with an electronic commerce ("e-commerce") website on her smartphone. Yet, the user may find that the e-commerce website indicates that the shawl item is out of stock, possibly where the indication is generated by a lead inventory system associated with the e-commerce website. In some instances, the shawl item may indeed be out of stock with a merchant and/or a marketplace network. Yet, as contemplated above, the shawl item may also be improperly tagged and/or marked such that the shawl item is unrecognized by the lead inventory system and incorrectly identified as out of stock.

In view of the circumstances above, an intelligent routing system may be configured to access various other merchants and/or marketplace networks around the world. For example, the routing system may search and/or identify one or more international marketplace networks generally stocking the requested shawl item. Yet further, the system may identify the particular fabric of the requested shawl item, such as the 'cashmere.' In addition, the system may search and/or identify the networks stocking the cashmere, possibly the type of cashmere wool used to make the shawl item, the type of animals, such as cashmere goats, that produce the cashmere fabric, and/or the geographic regions where the animals are kept and/or herded, among various other characteristics associated with the shawl item. As such, in view of the range of such characteristics potentially available to the system's searching capabilities, the routing system may identify various networks, in India and China for example, that stock the requested shawl item.

Notably, the routing system may generate numerous parallel queries to the various marketplace networks globally. In particular, the routing system may utilize existing interfaces and networks associated with the e-commerce website described above to search for the shawl item. For example, the routing system may utilize various application programming interfaces (APIs) associated with the servers running the e-commerce website, possibly based on sharing agreements with the provider of the e-commerce website. As such, the system may search and/or identify one or more inventories stocked with the requested shawl item, where the one or more inventories may be located in different countries. Further, the system may send the search results back to the user's smartphone or other user device. Notably, the search results sent may enable the smartphone to display the search results, possibly sorting and/or ranking the search results based on user preferences. As such, the searches may be performed quickly and efficiently, thereby improving search speed, search efficiency, and optimizing the accuracy of the search results.

In some embodiments, the routing system may generate a secondary market for the items requested. For example, considering the scenarios above, a lead merchant associated with the request for the shawl item may indicate that the shawl item is out of stock. In some instances, the routing system may identify one or more other second merchants with the shawl item in stock. In such instances, the lead merchant may retrieve bids from the one or more second merchants to satisfy the request for the shawl item. In particular, the retrieved bids may be based on various forms of information and/or data, such as a price for the shawl item, a stocking fee and/or an inventory fee associated with shawl item, a cost to ship and/or deliver the shawl item from the respective merchant to a location of the user, the speed of delivering the item to the location of the user, the method and/or quality of the delivery of the item, and ratings associated with the respective merchant, among other forms of data associated with the request. In some embodiments, the routing system may determine respective ratings for the user and the second merchants, where the ratings may be based on inputs from the lead merchant. In some embodiments, the routing system may determine levels of trust between the lead merchant and the second merchants.

In some embodiments, the routing system may operate transparently with the e-commerce website described above, such that the shawl item appears on the website to be shipping from the lead merchant. In some instances, the lead merchant may accept one or more liabilities and/or warranties associated with the shawl item shipped to the user, possibly since the user is expecting the shawl item to arrive from the lead merchant. Thus, the routing system may determine a fee that the second merchant is required to transfer to the lead merchant based on such liabilities accepted by the lead merchant.

Yet, in some embodiments, a second e-commerce website associated with the second merchant may indicate that the lead merchant is out of stock with respect to the shawl item. Further, the second e-commerce website may notify users of the secondary market generated by the routing system described above. As such, the second e-commerce website may be configured to make a transaction for the user to purchase the shawl item from the second e-commerce website, the secondary market, and/or other remote markets, among other possibilities.

In some embodiments, the routing system may generate and/or maintain a catalog database with numerous items available from various marketplace networks and second merchant inventories, possibly referred as stocked inventory systems. In some instances, the routing system may generate and/or maintain the stocked inventory systems in real-time, such that the stocked inventory systems may also be referred to as real-time inventory systems. Further, the routing system may be configured to maintain the catalog database with greater depths described herein based on the various marketplace networks and the stocked inventory systems.

FIG. 1 is a simplified block diagram of an exemplary system 100, according to an embodiment. As shown, the system 100 may include a server 102. The server 102 may be configured to perform operations of a provider, such as PayPal, Inc. of San Jose, Calif., USA. Further, the system 100 may also include a client device 104 and a client device 106. As such, the server 102 and the client devices 104 and 106 may be configured to communicate over the one or more networks 108. As such, the system 100 includes multiple computing devices 102, 104, and/or 106.

The system 100 may operate with more or less than the computing devices 102, 104, and/or 106 shown in FIG. 1, where each device may be configured to communicate over the one or more communication networks 108, possibly to transfer data accordingly. The one or more communication networks 108 may include a packet-switched network configured to provide digital networking communications and/or exchange data of various forms, content, type, and/or structure. In some instances, the one or more communication networks 108 may include a data network, a private network, a local area network (LAN), a wide area network (WAN), a telecommunications network, and/or a cellular network, among other possible networks. In some instances, the communication network 108 may include network nodes, web servers, switches, routers, base stations, microcells, and/or various buffers/queues to transfer data/data packets 122 and/or 124.

The data/data packets 122 and/or 124 may include the various forms of data associated with the user accounts described herein. The data/data packets 122 and/or 124 may be transferable using communication protocols, such as packet layer protocols, packet ensemble layer protocols, and/or network layer protocols, among other types of communication protocols. For example, the data/data packets 122 and/or 124 may be transferable using transmission control protocols and/or internet protocols (TCP/IP). In various embodiments, each of the data/data packets 122 and 124 may be assembled or disassembled into larger or smaller packets of varying capacities, such as capacities varying from 1,000 to 1,100 bytes, for example, among other possible data capacities. As such, data/data packets 122 and/or 124 may be transferable over the one or more networks 108 and to various locations in the one or more networks 108.

In some embodiments, the server 102 may take a variety of forms. The server 102 may be an enterprise server, possibly operable with one or more operating systems to facilitate the scalability of the architecture within the system 100. For example, the server 102 may operate with a Unix-based operating system configured to integrate with a growing number of servers in the one or more networks 108, the client devices 104 and/or 106, among other computing devices configured to communicate with the system 100. The server 102 may further facilitate workloads associated with numerous data transfers in view of an increasing item requests generated by the client devices 104 and/or 106. In particular, the server 102 may facilitate the scalability relative to such an increasing number of item requests to eliminate data congestion, bottlenecks, and/or transfer delays.

In some embodiments, the server 102 may include multiple components, such as one or more hardware processors 112, non-transitory memories 114, non-transitory data storages 116, and/or communication interfaces 118, among other possible components described in relation to FIG. 1, any of which may be communicatively linked via a system bus, network, or other connection mechanism 122. The one or more hardware processors 112 may take the form of a multi-purpose processor, a microprocessor, a special purpose processor, a digital signal processor (DSP) and/or other types of processing components. For example, the one or more hardware processors 112 may include an application specific integrated circuit (ASIC), a programmable system-on-chip (SOC), and/or a field-programmable gate array (FPGA). In particular, the one or more hardware processors 112 may include a variable-bit (e.g., 64-bit) processor architecture configured to transfer the data packets 122 and/or 124. As such, the one or more hardware processors 112 may execute varying instructions sets (e.g., simplified and complex instructions sets) with fewer cycles per instruction than other general-purpose hardware processors, thereby improving the performance of the server 102.

In practice, for example, the one or more hardware processors 112 may be configured to read instructions from the non-transitory memory component 114 to cause the system 100 to perform operations. For example, the server 102, possibly referred to as the routing system 102, may determine a request 122 for an item generated by the client device 104, possibly referred to as the user device 104. Further, the routing system 102 may search for the item with the client device 106, possibly referred to as the lead inventory system 106 associated with the one or more networks 108. In some instances, the lead inventory system 106 may be out of the requested item.

Yet further, the routing system 102 may identify one or more stocked inventory systems based at the lead inventory system 106 associated with the one or more networks 108. In some instances, the one or more stocked inventory systems may be stocked with the requested item. In addition, the routing system 102 may route the request 122 for the item to the one or more stocked inventory systems stocked with the requested item, where the routed request 124 may be routed over the one or more networks. As such, the routing system 102 may identify at least one stocked inventory system from the one or more stocked inventory systems able to provide the requested item from the one or more stocked inventory systems.

The non-transitory memory component 114 and/or the non-transitory data storage 116 may include one or more volatile, non-volatile, and/or replaceable storage components, such as magnetic, optical, and/or flash storage that may be integrated in whole or in part with the one or more hardware processors 112. Further, the memory component 114 may include or take the form of a non-transitory computer-readable storage medium, having stored thereon computer-readable instructions that, when executed by the hardware processing component 112, cause the server 102 to perform operations described in this disclosure, illustrated by the accompanying figures, and/or otherwise contemplated herein.

The communication interface component 118 may take a variety of forms and may be configured to allow the server 102 to communicate with one or more devices, such as the client devices 104 and/or 106. For example, the communication interface 118 may include a transceiver that enables the server 102 to communicate with the client devices 104 and/or 106 over the one or more networks 108. In some instances, the communication interface 118 may include a wired interface, such as an Ethernet interface, to communicate with the client devices 104 and/or 106. Further, in some instances, the communication interface 118 may include a cellular interface, such as a Global System for Mobile Communications (GSM) interface, a Code Division Multiple Access (CDMA) interface, and/or a Time Division Multiple Access (TDMA) interface. Yet further, in some instances, the communication interface 118 may include a local area network interface, such as a WI-FI interface configured to communicate with a number of different protocols. As such, the communication interface 118 may include a wireless interface operable to transfer data over short distances utilizing short-wavelength radio waves in approximately the 2.4 to 2.485 GHz range. In some instances, the communication interface 118 may send/receive data or data packets 122 and/or 124 to/from client devices 104 and/or 106.

The client devices 104 and 106 may also be configured to perform a variety of operations such as those described in this disclosure, illustrated by the accompanying figures, and/or otherwise contemplated herein. In particular, the client devices 104 and 106 may be configured to transfer data packets 122 and/or 124 associated with a user account to and from the server 102. The data packets 122 and/or 124 may also include location data associated with the request items, such as Global Positioning System (GPS) data or GPS coordinate data. Yet further, the data packets 122 and/or 124 may include environmental data including triangulation data, beacon data, WI-FI data, temperature data, and/or sensor data. In addition, the data packets 122 and/or 124 may include movement data, emotional data, demonstrative data, physiographical data, body temperature data, among other types of data potentially related to one or more users.

In some embodiments, the client devices 104 and 106 may include or take the form of a smartphone system, a personal computer (PC), such as a laptop device, a tablet computer device, a wearable computer device, a head-mountable display (HMD) device, a smart watch device, and/or other types of computing devices configured to transfer data associated with a user account. The client devices 104 and 106 may include various components, including, for example, input/output (I/O) interfaces 130 and 140, communication interfaces 132 and 142, hardware processors 134 and 144, and non-transitory data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to users of the client devices 104 and 106. For example, the I/O interface 130 may include a graphical user interface (GUI) configured to receive a user input that activates the provider application with the other applications. Thus, the I/O interfaces 130 and 140 may include displays and/or input hardware with tangible surfaces, such as touchscreens with touch sensors and/or proximity sensors configured with variable sensitivities to detect the touch inputs from a user. The I/O interfaces 130 and 140 may also be synced with a microphone, sound speakers, and/or other audio mechanisms configured to receive voice commands. Further, the I/O interfaces 130 and 140 may also include a computer mouse, a keyboard, and/or other interface mechanisms. In addition, I/O interfaces 130 and 140 may include output hardware, such as one or more touchscreen displays, haptic feedback systems, and/or other hardware components.

In some embodiments, communication interfaces 132 and 142 may take a variety of forms. For example, communication interfaces 132 and 142 may be configured to allow client devices 104 and 106, respectively, to communicate with one or more devices according to a number of protocols described or contemplated herein. For instance, communication interfaces 132 and 142 may be configured to allow client devices 104 and 106, respectively, to communicate with the server 102 via the one or more communication networks 108. The processors 134 and 144 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components described or contemplated herein.

The data storages 136 and 146 may include one or more volatile, non-volatile, removable, and/or non-removable storage components, and may be integrated in whole or in part with processors 134 and 144, respectively. Further, data storages 136 and 146 may include or take the form of non-transitory computer-readable mediums, having stored thereon instructions that, when executed by processors 134 and 144, cause the client devices 104 and 106 to perform operations, respectively, such as those described in this disclosure, illustrated by the accompanying figures, and/or otherwise contemplated herein.

In some embodiments, the user device 104 may generate a request for one or more items with a user account. For example, the generated request may be encoded in the data packet 122 to establish a connection with the routing system 102. As such, the data packet 122 may initiate a search of an internet protocol (IP) address of the routing system 102 that may take the form of the IP address, 192.168.1.102, for example. In some instances, an intermediate server, e.g., a domain name server (DNS) and/or a web server, possibly in the one or more networks 108 may identify the IP address of the routing system 102 to establish the connection between the user device 104 and the routing system 102. As such, the routing system 102 may identify one or more stocked inventory systems based on routing the request encoded in the data packet 122. In particular, the routing system may route the data packet 122 from the user device 104 to the lead inventory system 106 to search and/or identify the one or more stocked inventory systems.

It can be appreciated that the routing system 102 and the user device 104 and/or the lead inventory system 106 may be deployed in various other ways. For example, the operations performed by the system 102 and/or the user device 104 and the system 106 may be performed by a greater or a fewer number of devices. Further, the operations performed by two or more of the systems and/or devices 102, 104, and/or 106 may be combined and performed by a single device. Yet further, the operations performed by a single device may be separated or distributed among the system 102, the user device 104, and the system 106.

Notably, a user account associated with a provider may be displayed on the client device 104, possibly with the I/O interface 130. For example, a provider application of the client device 104 may be configured to access the user account displayed on the I/O interface 130. In some instances, the user account may be a personal account associated with funds. Further, the user account may be a corporate account, such that employees, staff, worker personnel, and/or contractors, among other individuals may have access to the corporate account. Further, an account may be a family account created for multiple family members, where each member may have access to the account. Yet further, it should be noted that a user may be a number of individuals, a group, and/or possibly a robot, a robotic device, and/or a robotic system, among other computing devices capable of transferring data associated with the user account. In some instances, login data may be required to access the user account and/or perform a transfer with the account. For example, the data required may include credential information, such as a login, an email address, a username, a password, a phone number, a security code, an encryption key, authentication data, biometric data (e.g., fingerprint data), and/or other types of data to access the user account and/or perform a transfer with the account.

FIG. 2A illustrates an exemplary system 200 with a routing device 202, according to an embodiment. In some instances, the routing device 202, possibly also referred to as the routing system 202, may take the form of the server 102 described above in relation to FIG. 1. As shown, the routing device 202 may be coupled with one or more marketplace networks 208 that may, for example, take the form of the one of more communication networks 108 described above. Yet further, the user device 204 may take the form of the client device 104 described above. In addition, the lead merchant device 206, possibly also referred to as the lead inventory system 206, may take the form of the client device 106 described above. In some instances, the lead inventory system 206 may manage a website, possibly referred to as "merchant206.com," for purposes of illustration.

Considering the scenarios described, the routing device 202 determines a user request for an item (e.g., the shawl item) generated by the user device 204. In particular, the request may be embedded in a data packet, such as the data packet 122 described above, possibly transmitted over the one or more marketplace networks 208. In some instances, the user request may indicate and/or identify the lead merchant associated with the device 206, possibly identifying the lead merchant as the provider of the requested item. As such, the routing device 202 may search for the requested item with the lead merchant device 206, possibly where the lead merchant device 206 is associated with one or more inventories of the lead merchant. In some instances, the lead merchant may be out of stock. In particular, the one or more inventories of the lead merchant may be out of the requested item.

In some embodiments, the routing device 202 may initiate a search for the requested item with the lead merchant device 206 based on various interfaces associated the device 206, possibly integrated with the one or more marketplace networks 208. In such instances, the routing device 202 may identify one or more stocked inventories and/or inventory systems stocked with the requested item based on the lead merchant 206 and interfaces associated with the device 206, potentially leveraging existing API interfaces and/or network resources for improving the search speed and search accuracy. Thus, the routing device 202 may route the request for the item to the one or more stocked inventory systems identified. Further, the routing device 202 may complete a transaction for the requested item such that the item is shipped to a location associated with the user device 204, such as a location of the lead merchant device 206.

Figure 2B:
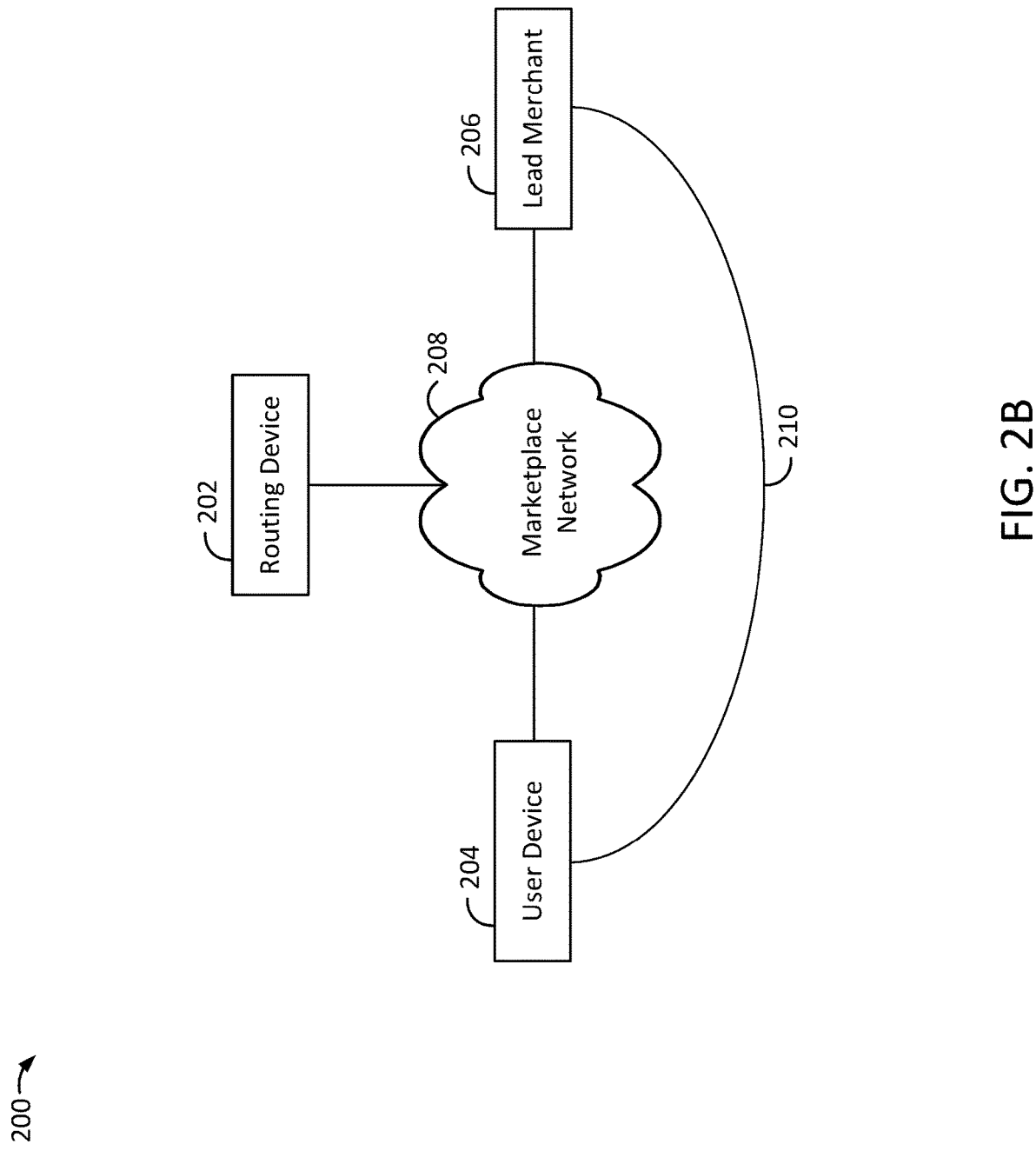
FIG. 2B illustrates an exemplary system with a routing device and a connection, according to an embodiment.

FIG. 2B illustrates the exemplary system 200 with a routing device 202 and a connection 210, according to an embodiment. As shown, the system 200 includes the user device 204, the lead merchant device 206, and the one or more marketplace networks 208 described above. Further, the system 200 includes a connection 210 with the user device 204 and the lead merchant device 206. As noted, the user request may indicate and/or identify the lead merchant associated with the lead merchant device 206, possibly identifying the lead merchant as a provider of the requested item. As such, the routing device 202 may search for the requested item with the lead merchant device 206. Yet, in instances where the lead merchant may be out of stock, the routing device 202 may establish the connection 210, possibly a direct connection 210 with user device 204. As such, the lead merchant device 206 may initiate the search for the requested item based on the direct connection 210. For example, the lead merchant device 206 may initiate the search with search details retrieved from the user device 204. As noted, the search may be based on various interfaces of the lead merchant device 206, possibly integrated with the one or more marketplace networks 208 and other possible networks associated with the lead merchant device 206.

As described above, the routing device 202 may identify the one or more stocked inventories and/or inventory systems stocked with the requested item based on the lead merchant device 206 and interfaces associated with the lead merchant device 206, potentially leveraging existing API interfaces and/or network resources for improving the search speed and search accuracy. Thus, the routing device 202 may route the request for the item to the lead merchant device 206 and also to the one or more stocked inventory systems identified. Further, the routing device 202 may complete a transaction for the requested item such that the item is shipped to a location associated with the user device 204.

Notably, the routing device 202 may intelligently search and/or identify one or more international networks, possibly in the one or more marketplace networks 208, that stock the shawl requested item. Yet further, the routing device 202 may identify the particular fabric of the shawl requested item, such as the various types of cashmere described above. In addition, the routing device 202 may search and/or identify the networks stocking the type of cashmere, such as the type of cashmere wool used to make the shawl requested item. As noted, the routing device 202 may also search and/or identify various forms of item data indicating the type of animals that produce the cashmere fabric, such as cashmere goats, the geographic regions where the animals are located, and/or the suppliers of the cashmere fabric, among various other characteristics associated with the shawl item requested. The routing device 202 may feed the item data to the lead merchant device 206 over the one or more marketplace networks 208.

Figure 2C:
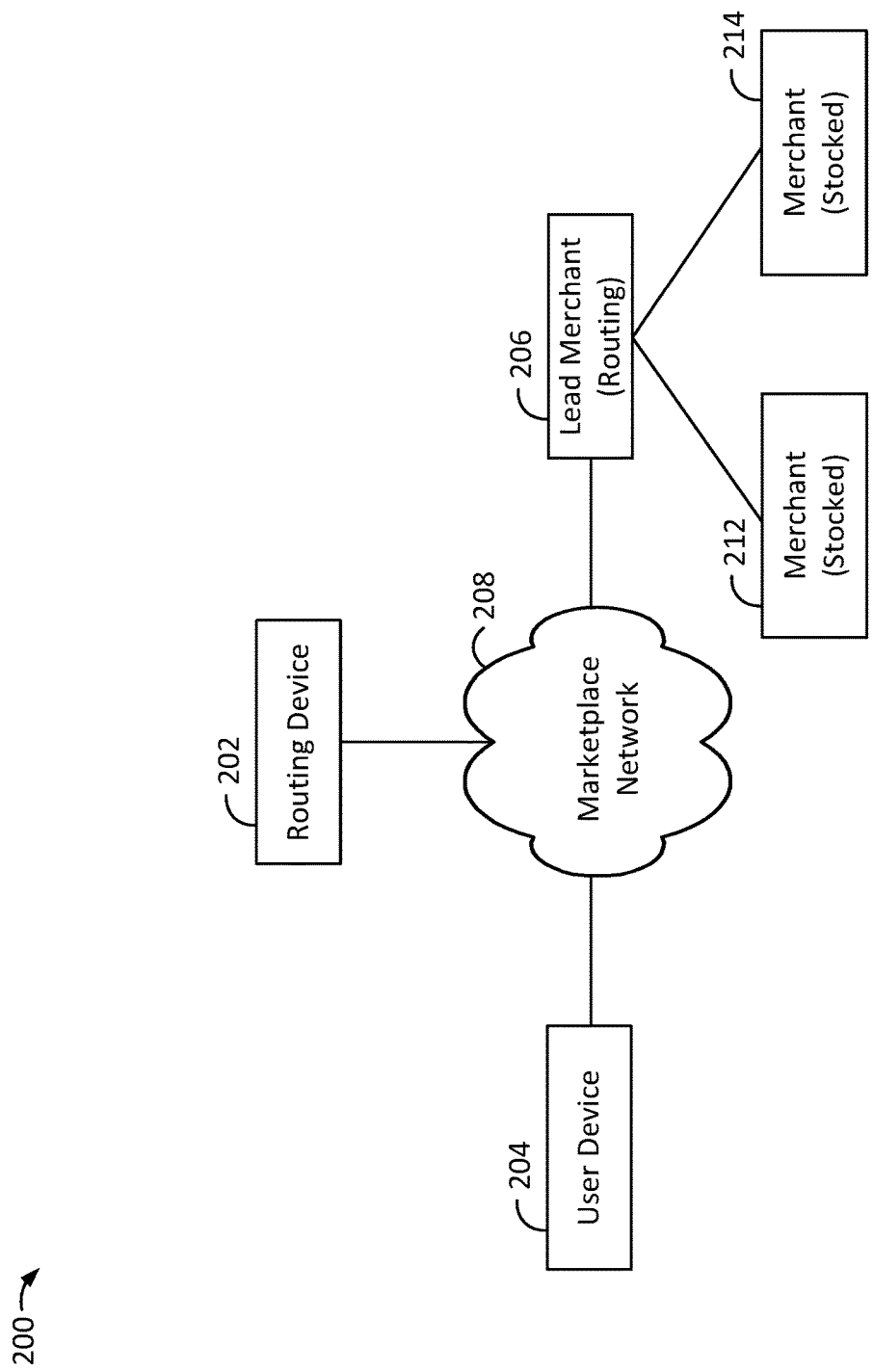
FIG. 2C illustrates an exemplary system with a routing device and one or more stocked merchants, according to an embodiment.

FIG. 2C illustrates the exemplary system 200 with the routing device 202 and one or more stocked merchants 212 and 214, according to an embodiment. As shown, the system 200 includes the routing device 202, the user device 204, the lead merchant device 206, and the one or more marketplace networks 208 described above. Further, the system 200 includes one or more stocked merchant devices 212 and/or 214.

As noted, the routing device 202, also referred to as the routing system 202, may determine a user request for an item generated by the user device 204. In particular, the request may be embedded in a data packet, such as the data packet 122 described above, possibly transmitted over the one or more marketplace networks 208 to the routing device 202. In some instances, the user request may indicate and/or identify the lead merchant associated with the device 206, possibly identifying the lead merchant as the provider of the requested item. As such, the routing system 202 may search for the requested item with the lead merchant device 206, possibly where the lead merchant device 206 is associated with one or more inventories of the lead merchant. In some instances, the lead merchant may be out of stock of the requested item. In particular, the one or more inventories of the lead merchant may be out of the requested item.

In some embodiments, the routing system 202 may identify one or more stocked merchants 212 and/or 214, possibly referred to as the one or more stocked inventory systems 212 and/or 214. For example, the routing system 202 may identify the stocked inventory systems 212 and/or 214 based on the lead inventory system 206 associated with the one or more networks 208. In particular, the routing device 202 may identify the one or more stocked inventory systems 212 and/or 214 are stocked with the requested item, possibly based on various interfaces associated with the lead inventory system 206, possibly integrated with the one or more networks 208.

As such, the routing system 202 may route the request for the item to the one or more inventory systems 212 and/or 214 stocked with the requested item. Further, the routing system 202 may identify at least one stocked inventory system, such as the inventory system 212, from the stocked inventory systems 212, 214, and other possible stocked inventory systems. Yet further, the inventory system 212 may be identified in instances where the system 212 is able to provide the requested item, possibly ship the requested item from the stocked inventory system 212 to a location of the user device 204.

In some embodiments, where the requested item may correspond with one or more identification codes, possibly also referred to as provider product codes and/or PayPal product codes (PPC) associated with a provider, such as PayPal, Inc. of San Jose, Calif., USA. The PPC may be associated with universal stock keeping units (SKUs), universal product codes (UPC), and/or international article numbers (EAN) including multi-digit barcodes, among other types of codes that indicate manufacturers, descriptions, materials, sizes, colors, packaging, and/or warranties associated with the requested item. Thus, the routing system 202 may search for the requested item with the one or more identification codes with the lead inventory system 206 associated with the one or more networks 208.

In some embodiments, the routing system 202 may determine various bids received to satisfy the user request, such as by shipping the item to a location associated with the user device 204. For example, the routing system 202 may determine a respective bid from each of the one or more stocked inventory systems 212 and/or 214. In some instances, the respective bids may be based on the one or more stocked inventory systems 212 and/or 214 configured to and/or able to ship the requested item, possibly to a location associated with the user device 204. Further, respective bids may be based on various other factors, such as each merchant's asking price for the requested item, the stocking fees of the item, the shipping costs of the item potentially to the location of the user device 204, the speed or time it takes to deliver the item to the location, the quality of service in delivering the item, and/or various ratings associated with deliveries from the systems 212 and/or 214, among other possibilities.

In some instances, the respective bids may be based on the capabilities of the systems 212 and/or 214 shipping the requested item from respective locations associated with the one or more stocked inventory systems 212 and/or 214 to a location associated with the user device 204. For example, consider that the inventory system 212 is located in Canada, the inventory system 214 is located in China, and the location associated with the user device 204 is in the U.S. In such instances, the inventory system 212 may be identified and/or selected to ship the requested item based on the respective bid from the stocked inventory system 212, where the bid may reflect lower costs associated with shipping from Canada to the U.S., as opposed to the bid from the system 214 reflecting higher costs associated with shipping from China to the U.S.

Figure 2D:
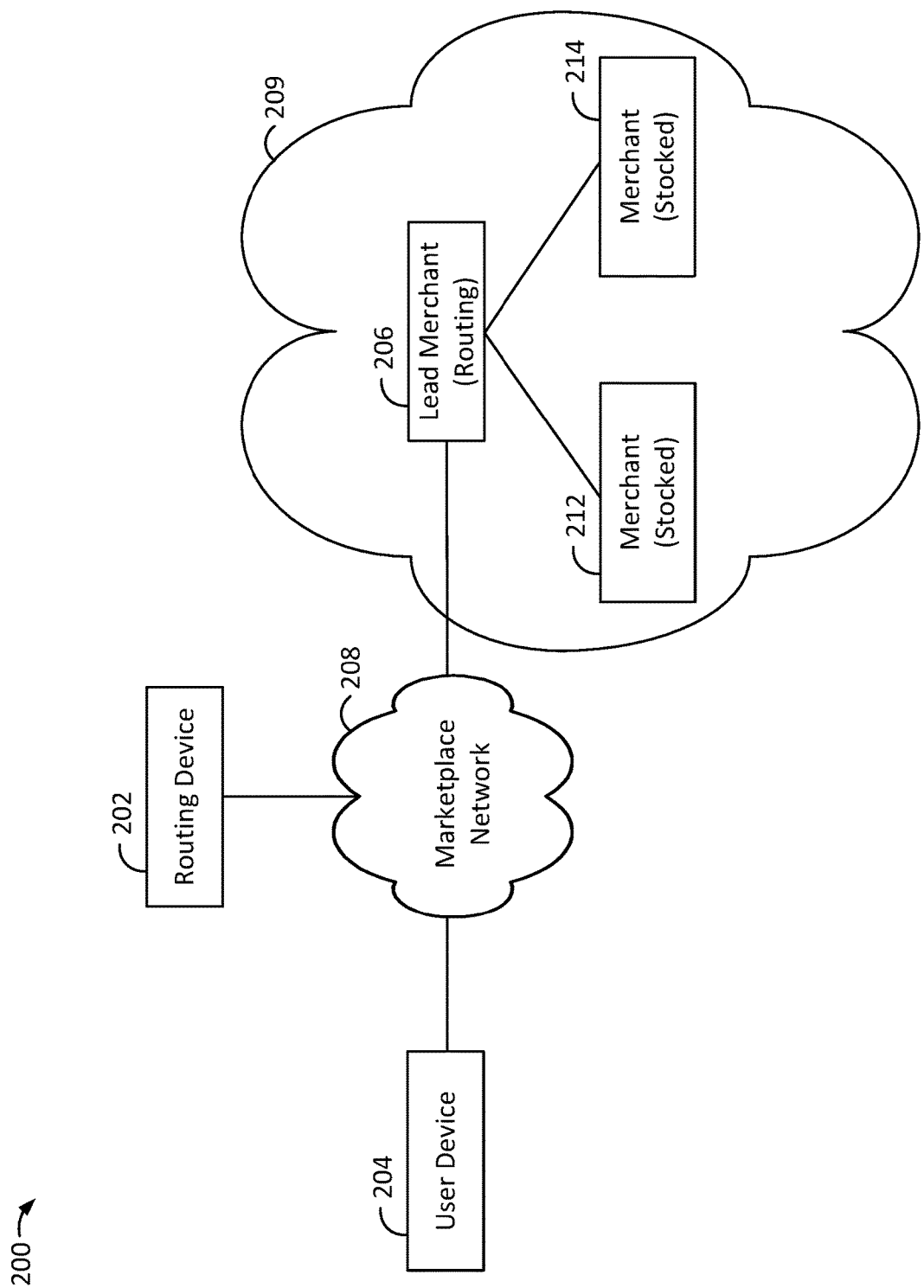
FIG. 2D illustrates an exemplary system with a routing device and one or more stocked merchants associated with one or more networks, according to an embodiment.

FIG. 2D illustrates the exemplary system 200 with the routing device 202 and one or more stocked merchants 212 and 214 associated with one or more networks 209, according to an embodiment. As shown, the system 200 includes the routing device 202, the user device 204, the lead merchant device 206, and the one or more marketplace networks 208 described above. Further, the system 200 includes one or more stocked merchant devices 212 and/or 214.

In some embodiments, the one or more networks 208 may be associated with a secondary marketplace network 209. Further, in some instances, the requested item may be identified from a secondary market catalog associated with the secondary marketplace network 209. In some instances, the secondary market catalog may identify items without universal stock keeping units (SKUs), universal product codes (UPC), and/or international article numbers (EAN), among other forms of product codes. For example, the secondary market catalog may identify items held by smaller merchants, independent merchants, family-owned entities (e.g., "mom-and-pop shops"), and/or other types of entities other than franchises and larger corporations.

In some instances, the routing device 202, also referred to herein as the routing system 202, may search for the requested item with the lead inventory system 206 based on searching for the requested item with the secondary marketplace network 209. As such, the one or more stocked inventory systems 212 and/or 214 may be identified from the search for the requested item based on the requested item searched with the secondary marketplace network 209. Notably, the routing system 202 may generate the secondary marketplace network 209 based on the capabilities of the system 202 routing user requests with the lead inventory system 206 and/or the secondary marketplace network 209.

As noted, the routing system 202 may cause the requested item to ship from the stocked inventory system 212 to a location of the user device 204. Further, the routing system 202 may determine a respective rating for each of the one or more stocked inventory systems 212, 214, and/or other possible stocked inventory systems. In some instances, the routing system 202 may determine the respective ratings based on respective user ratings provided for each of the one or more stocked inventory systems 212 and/or 214, possibly based on user surveys received with the routing system 202. Further, the routing system 202 may determine the respective ratings based on respective merchant ratings for each of the one or more stocked inventory systems 212 and/or 214, possibly based on merchant surveys received with the routing system 202. As such, the stocked inventory system 212 may be identified and/or selected based on the respective user ratings and/or the respective merchant ratings associated with stocked inventory system 212.

In some embodiments, the routing system 202 may cause the stocked inventory system 212 to ship the requested item from the inventory of the system 212 holding the requested item to a location associated with the user device 204. Yet further, the routing system 202 may track various compensations for each segment of a distance the item travels from the inventory of the system 212 to the location associated with the user device 204. In particular, the routing system 202 may track the various compensations based on the data retrieved from the one or more networks, such as the marketplace network 208 and/or the secondary marketplace network 209, possibly as the item is shipped over each segment of the distance to the location associated with the user device 204.

Figure 2E:
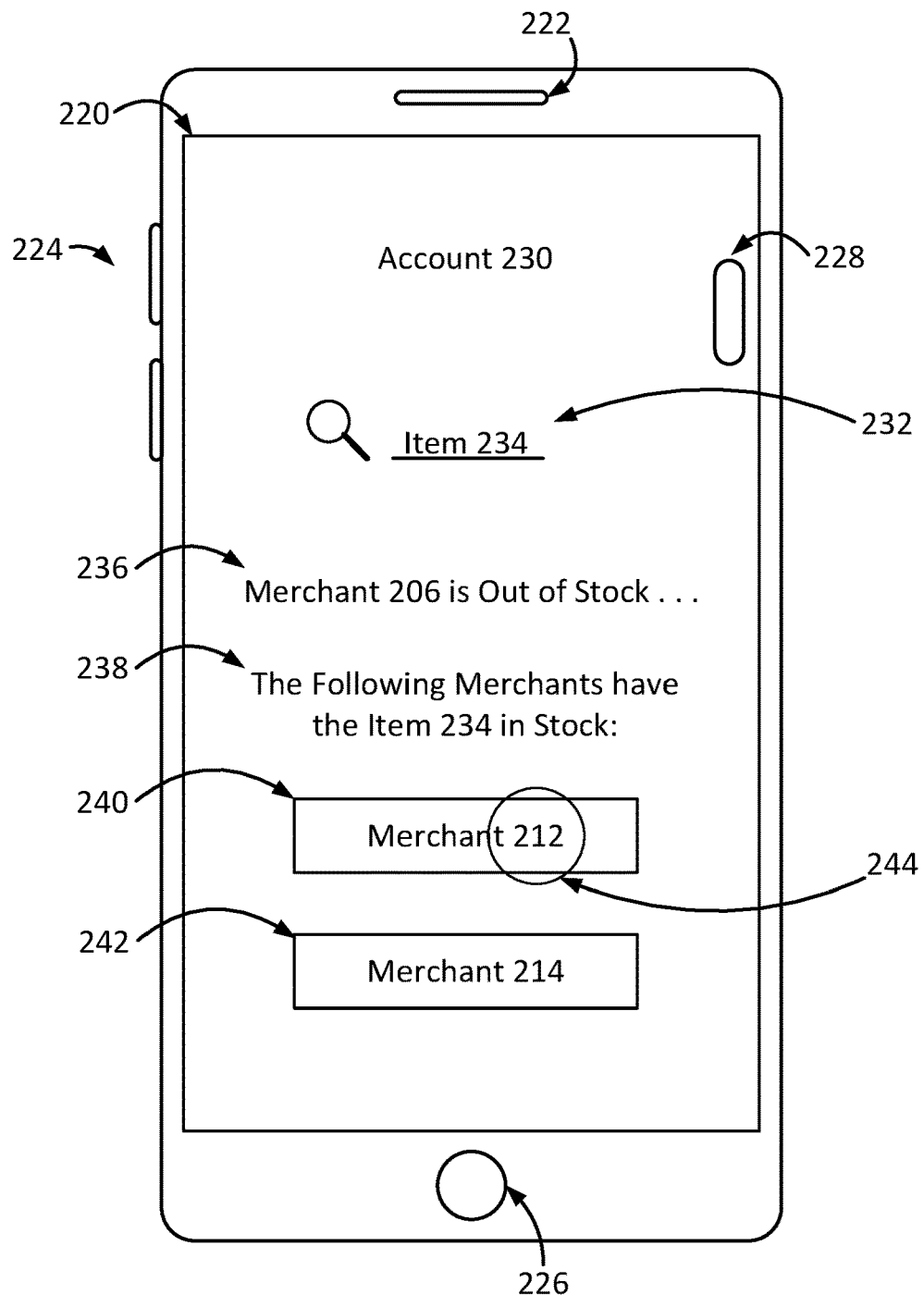
FIG. 2E illustrates an exemplary device, according to an embodiment.

FIG. 2E illustrates an exemplary device 204, according to an embodiment. In some instances, the device 204 may take the form of the user device 204 described above in relation to FIGS. 2A-2D. As shown, the device 204 may include the I/O interface 220, where the I/O interface 220 takes the form of the I/O interface 130 described above in relation to FIG. 1. In particular, the I/O interface 220 may include a touch-sense interface configured to detect one or more touch inputs from a user. Further, as shown, the user device 204 may include a speaker 222, one or more buttons 224, and/or a button 226. The button 226 may include a fingerprint sensor configured to detect and/or identify one or more fingerprints of the user, possibly to authenticate a transaction with an account 230 of the user.

Further, as shown, the I/O interface 220 may display a search 232 for the requested item 234. In view of the scenarios above, the search 232 for the requested item 234 may indicate the words, "cashmere shawl," "shawl with cashmere wool," and/or "cashmere shawl with a paisley print," among other possible words that describe the requested item 234. For example, the words may be detected and/or recognized by the microphone described above in relation to the I/O interfaces 130 and 140, possibly also detected with voice over internet protocol (VoIP). Yet further, the words may be detected and/or recognized with images, including images of stock keeping units (SKUs), universal product codes (UPC), and/or international article numbers (EAN) including multi-digit barcodes read with laser detection, among other possibilities, potentially where the images are captured with mobile cameras of the I/O interfaces 130 and 140. In some instances, the routing system 202 may search for the item 234 with the lead inventory system 206 associated with the one or more networks 208 and/or 209.

In some instances, the routing system 202 may identify that the lead inventory system 206 is out of stock of the requested item 234. As such, the routing system 202 may cause the user device 204 to display the notification 236 with the I/O interface 220 indicating, "Merchant 206 is Out of Stock." Yet, the routing system 202 may identify the one or more stocked inventory systems 212 and/or 214, possibly based on the lead inventory system 206 and/or the one or more networks 208 and/or 209 associated with the lead inventory system 206. As such, the routing system 202 may cause the user device 204 to display the notification 238 with the I/O interface 220, indicating, "The Following Merchants have the item 234 in Stock." Further, the routing system 202 may cause the user device 204 to display the notifications 240 and/or 242 that indicate the merchants 212 and/or 214, respectively. In some instances, the merchants 212 and/or 214 may be ranked and/or ordered by pricing, user ratings, the time it takes to ship the item 234, other merchant ratings, location, quality ratings, among other possibilities.

Thus, the routing system 202 may cause the user device 204 to display a respective indication associated with each of the one or more stocked inventory systems 212 and/or 214 able to provide the requested item 234. Further, the requested item 234 may be shipped from the stocked inventory systems 212 to a location associated with the user device 204 based on a selection 244 of the respective notification 240. It should be noted that the requested item 234 may be shipped from the stocked inventory system 214 to the location of the user device 204 based on the selection 244 of the respective notification 242.

Figure 3A:
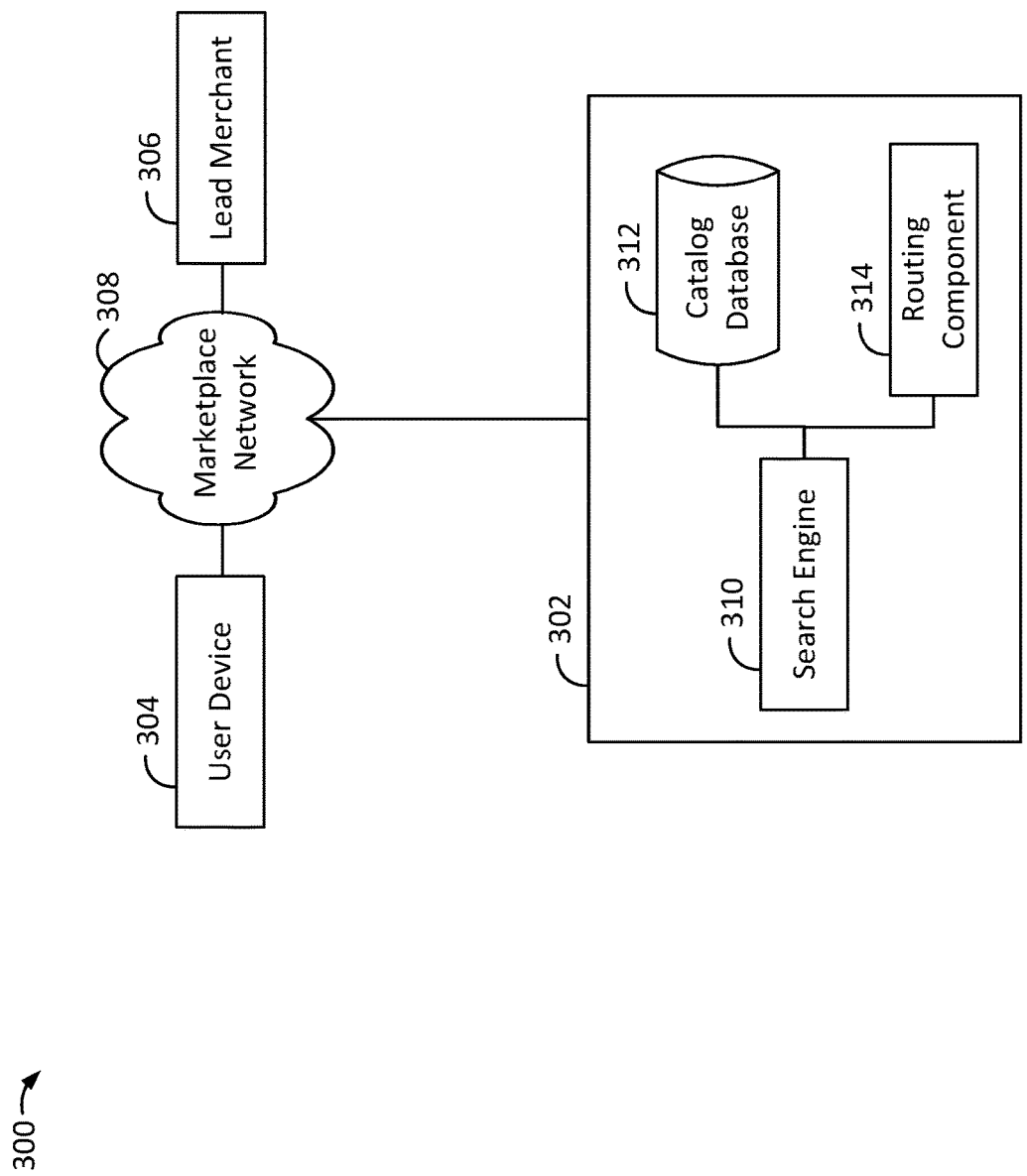
FIG. 3A illustrates an exemplary system with a routing device, according to an embodiment.

FIG. 3A illustrates an exemplary system 300 with a routing device 302, according to an embodiment. In some instances, the routing device 302, possibly also referred to as the routing system 302, may take the form of the server 102 and/or the routing system 202 described above in relation to FIGS. 1-2E. Notably, the routing system 302 may include various components of the server 120 such as the one or more hardware processors 112, non-transitory memories 114, non-transitory data storages 116, and/or communication interfaces 118, among other possible components described in relation to FIG. 1, any of which may be communicatively linked via a system bus, network, or other connection mechanism 122.

As shown, the routing system 302 may be coupled with one or more marketplace networks 308 that may, for example, take the form of the one of more networks 108 and/or 208 described above in relation to FIGS. 1-2E. Yet further, the user device 304 may take the form of the client device 104 and/or the user device 204 described above. In addition, the lead merchant device 306, possibly also referred to as the lead inventory system 306, may take the form of the client device 106 and/or the lead merchant device 206 described above.

As shown, the routing system 302 may include one or more search engines 310 to search for the requested items, such as the requested item 234 described above. For example, the one or more search engines 310 may search the one or more catalog databases 312, possibly populated by the routing system 306 and merchants, such as the merchants 206, 212, and/or 214 described above. Further, the one or more catalog databases 312 may be updated frequently, possibly every minute or second. As such, the one or more catalog databases 312 may be searched to identify the lead inventory system 306 and/or various stocked inventory systems, such as the systems 212 and 214 described above. Notably, the search engines 310 may search with voice inputs, images, textual search strings, textural descriptions based on touching or feeling the requested items, and/or other descriptions based on smell, sound, and/or tastes of the items, among other possibilities. Yet further, the routing system 302 may include the routing component 314 to route the requests to the stocked inventory systems 212 and/or 214 described above.

Figure 3B:
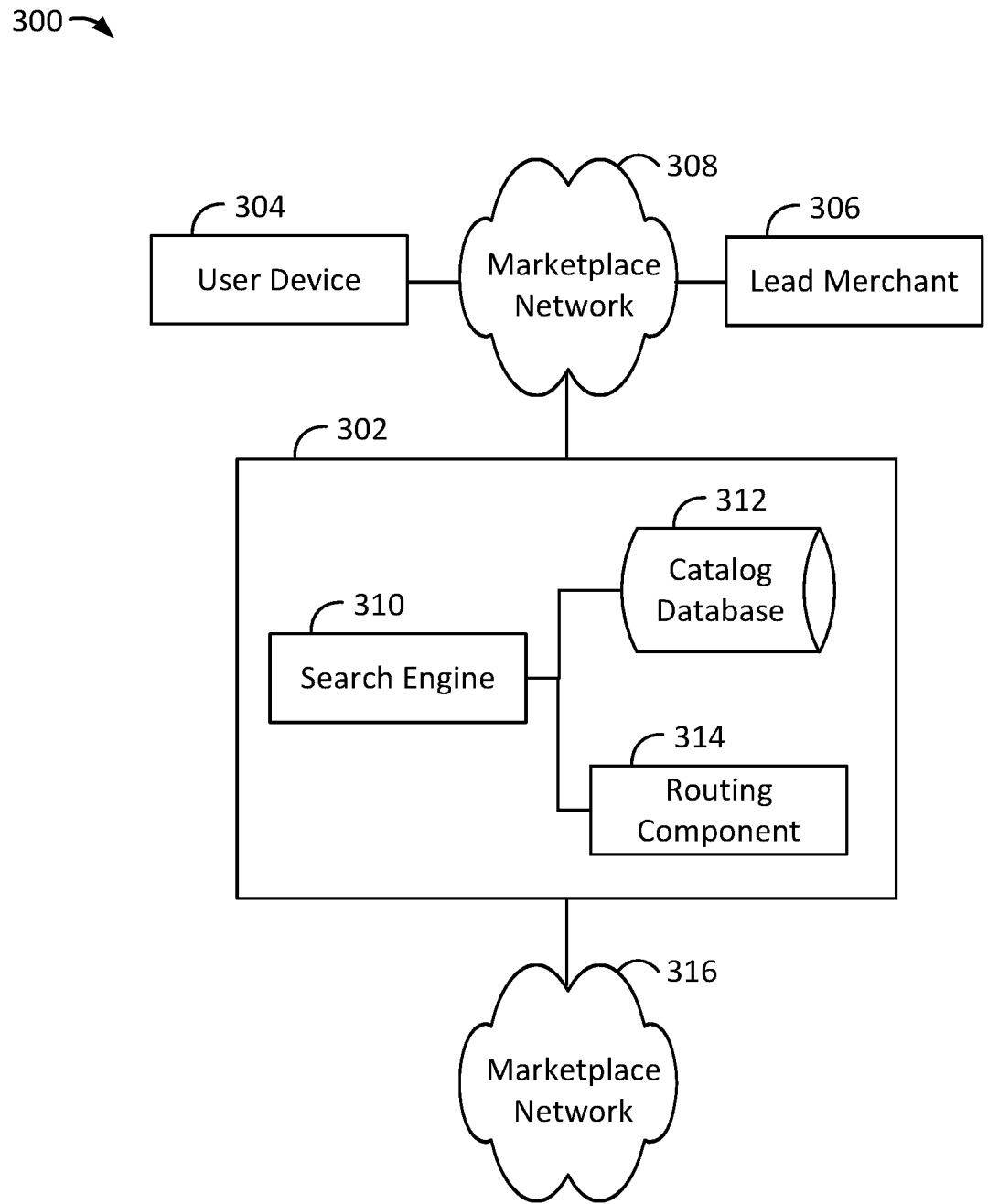
FIG. 3B illustrates the exemplary system with a routing device and one or more networks, according to an embodiment.

FIG. 3B illustrates the exemplary system 300 with the routing device 302 and one or more networks 308 and 316, according to an embodiment. As shown, the routing system 302 may be coupled with one or more marketplace networks 308 and/or 316. In some instances, the one or more marketplace networks 316 may, for example, take the form of the one of more networks 108, 208, and/or 308 described above. Yet further, the one or more marketplace networks 316 may take the form of the secondary marketplace network 209 described above. Notably, the one or more marketplace networks 316 may be generated by the routing system 302. As such, the one or more catalog databases 312 may include the secondary market catalog described above. Thus, the one or more catalog databases 312 may identify, track, and/or manage the items held by smaller merchants, independent merchants, family-owned entities, such as the "mom-and-pop shops," and/or the other types of entities other than the franchises and larger corporations.

As shown, the one or more search engines 310 may search for the requested items, such as the requested item 234, with the one or more catalog databases 312. For example, the search engines 310 may identify the lead inventory system 306 associated with the one or more marketplace networks 308. Further, the search engines 310 may identify various stocked inventory systems, such as the systems 212 and 214 described above, associated with the one or more marketplace networks 316. For example, the routing component 314 may route the requests to the lead inventory system 306 associated with the one or more marketplace networks 308, possibly to determine the lead inventory system 306 is out of stock of the requested items. Further, the routing component 314 may route the requests to the stocked inventory systems 212 and/or 214 associated with the one or more marketplace networks 316.

Figure 3C:
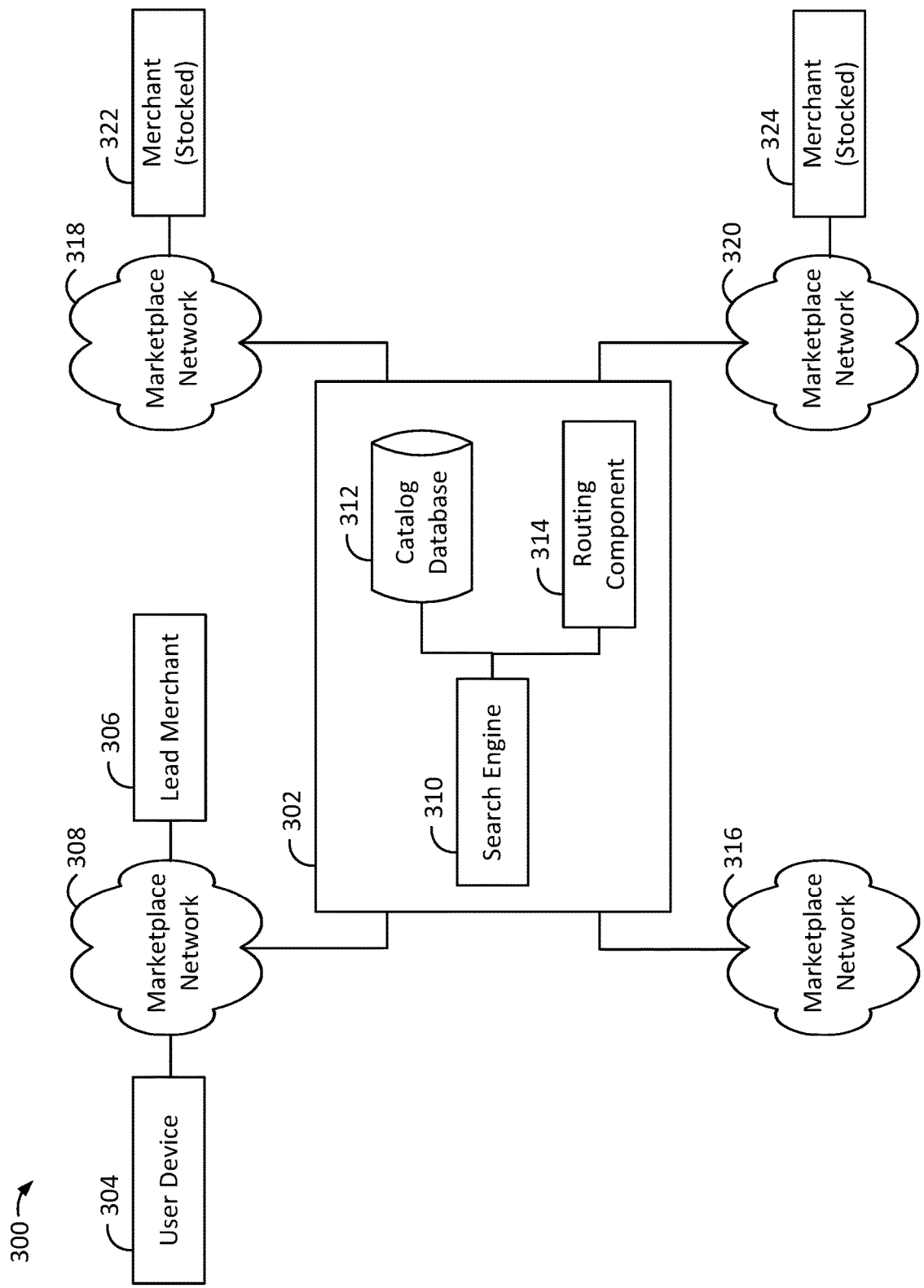
FIG. 3C illustrates the exemplary system with a routing device and one or more stocked merchants, according to an embodiment.

FIG. 3C illustrates the exemplary system 300 with the routing device 302 and one or more stocked merchants 322 and/or 324, according to an embodiment. As shown, the routing system 302 may be coupled with one or more marketplace networks 308, 316, 318, and/or 320. For example, the marketplace network 308 may take the form of an e-commerce website network 308. Further, the marketplace network 316 may take the form of a secondary marketplace network in China. Yet further, the marketplace network 316 may take the form of a secondary marketplace network in India. In addition, the marketplace network 320 may take the form of an online marketplace network hosting a number of e-commerce websites.

In some embodiments, the routing system 302 may determine a request for an item generated by the user device 304. Further, as noted, the routing system 302 may determine the lead merchant 306 associated with the marketplace network 308. Yet further, the routing system 302 may determine one or more inventories associated with the lead merchant 306, possibly referred to as the lead inventory 306, associated with one or more networks 308. In particular, the routing system 302 may determine the lead inventory 306 based on a number of policy preferences associated with the request for the item.

For example, the policy preferences may indicate various agreements associated with transactions for the requested item. Further, the policy preferences and/or the various agreements may indicate a number of fees, e.g., stocking fees and/or inventory fees, partners or other entities associated with the agreements, various limitations of the transaction for the requested item, and/or liabilities of such transactions for the requested item, among other factors associated with the transaction for the item. Yet further, the policy agreements and/or the various agreements may be associated with accepted use policies and/or trade blocks, such as the World Trade Organization (WTO) and/or the North American Free Trade Agreement (NAFTA), among other possibilities including, such as regulatory commissions, cross-border regimes, and/or banned product regulations.

As such, in some instances, the routing system 302 may determine the lead inventory 306 is out of stock of the requested item. Further, the routing system 302 may identify one or more merchants 322 and/or 324 with the requested item. For example, the routing system 302 may identify one or more stocked inventories of the merchants 322 and/or 324, possibly referred to as stocked inventories 322 and/or 324. Further, the routing system 302 may identify the stocked inventories 322 and/or 324 based on the lead inventory 306 associated with one or more marketplace networks 308, 316, 318, and/or 320. In particular, the routing system 302 may identify the stocked inventories 322 and/or 324 from various leads and/or interfaces associated with the lead inventory 306, possibly integrated with the marketplace networks 308, 316, 318 and/or 320.

As such, the routing system 302 may route the request for the item to the one or more stocked inventories 322 and/or 324 based on the lead inventory 306 associated with the one or more networks 308. In some embodiments, the routing system 302 may track a level of trust associated with the lead inventory 306 based on data retrieved from the lead inventory 306 to search and/or identify the stocked inventories 322 and/or 324. Further, the routing system 302 may determine a selection of at least one stocked inventory 322 from the one or more stocked inventories 322, 324, and/or other stocked inventories. Notably, the exemplary system 300 may include a non-transitory machine-readable medium, such as the memory 114, having stored thereon machine-readable instructions executable to cause a machine, such as the routing system 302, to perform the operations described above.

In some embodiments, each stocked inventory from the one or more stocked inventories 322 and/or 324 may be associated with a respective country. As noted, the stocked inventory 322 may located in India, and for purposes of illustration, the stocked inventory 324 may be located in China. As such, the stocked inventories 322 and 324 may be associated with the respective countries, such as India and China, where the countries include respective marketplace networks 318 and/or 320, potentially from among the various networks 308, 318, 316, and/or 320. As such, the routing system 302 may search with the one or more search engines 310 for the one or more stocked inventories 322 and/or 324, possibly utilizing data retrieved from the lead inventory 306 associated with the one or more networks 308. In some embodiments, the one or more stocked inventories 322 and/or 324 may be identified based on the one or more search engines 310 searching the catalog database 312.

In some embodiments, the routing system 302 may retrieve one or more catalogs from the catalog database 312, where the one or more catalogs include data entries associated with numerous items available from various international marketplace networks 308, 316, 318, and/or 320, and further various international merchant inventories 306, 322, and/or 324. For example, the system 302 may retrieve a respective catalog with the one or more catalog databases 312 for each of the one or more stocked inventories 322 and/or 324. Further, the routing system 302 may identify the one or more stocked inventories 322 and/or 324 able to provide the requested item based on the respective catalogs retrieved.

In some embodiments, the routing system 302 may determine a confirmation from at least one stocked inventory 322 to provide the requested item based on the number of policy preferences, possibly including individual policies associated with the stocked inventory 322. Notably, the individual policies may indicate a number of fees required by the stocked inventory 322, e.g., stocking fees and/or inventory fees), partners or other entities of the agreements, various limitations of the transaction for the requested item, and/or liabilities of the transactions with the requested item, among other factors associated with the transaction for the item. In some instances, the routing system 302 may cause the stocked inventory 322 to ship the requested item to a location associated with the user device 304 based on the confirmation. For example, the merchant 322 may send the confirmation in response to the item request routed from the lead merchant 306 to the merchant 322, possibly based on the various policies described. In some instance, the response may include a commitment to automatically ship the item from the inventory 322.

Figure 3D:
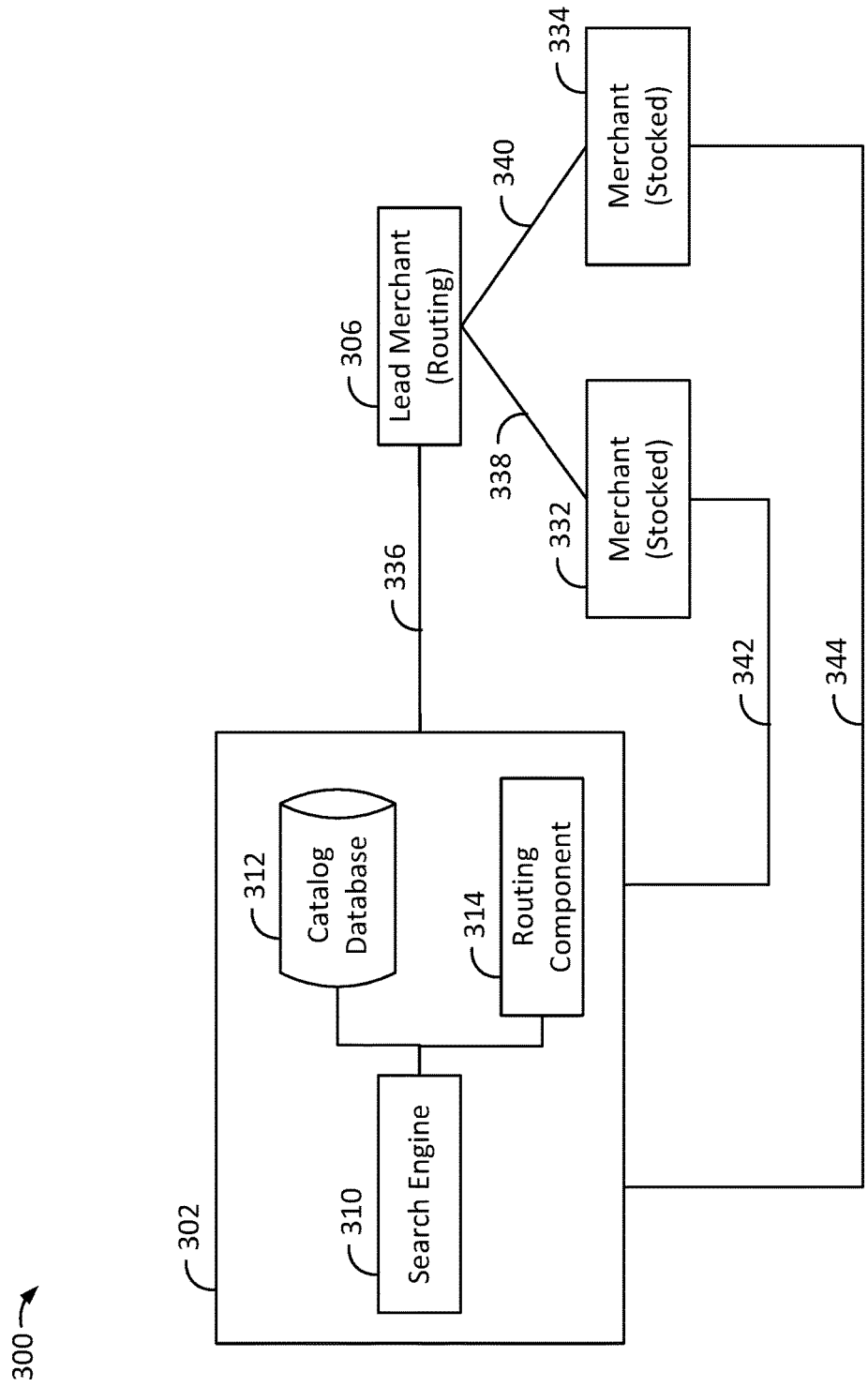
FIG. 3D illustrates the exemplary system with a routing device and one or more interfaces, according to an embodiment.

FIG. 3D illustrates the exemplary system 300 with the routing device 302 and one or more interfaces 336, 338, 340, 342, and/or 344, according to an embodiment. As shown, the routing system 302 may be coupled with the lead merchant 306 with the lead application programming interface (API) 336, possibly also referred to as the first API. Further, the routing system 302 may communicate with the stocked merchants 332 and/or 334 as described further below. In some instances, the stocked merchants 332 and/or 334 may take the form of the stocked merchants 322 and/or 324, respectively. Yet further, the stocked merchants 332 and/or 334 may take the form of the stocked merchants 212 and/or 214 described above in relation to 2C-2E, respectively.

In some embodiments, the routing system 302 may determine a request for one or more items generated by a user device, such as the user device 304 described above. Further, the routing system 302 may search for the one or more requested items in a shared catalog, possibly stored in the catalog database 312. In some instances, the shared catalog may be associated and/or shared with the lead merchant inventory 306 and a second merchant inventory 332. Further, the shared catalog may include the one or more requested items.

In some instances, the routing system 302 may determine the lead merchant inventory 306 is out of the one or more requested items based on the lead application programming interface (API) 336 with the lead merchant inventory 306. Yet, the routing system 302 may identify the second merchant inventory 332 is able to provide the one or more requested items based on a second application programming interface (API) 338 with the lead merchant inventory 306 and the second merchant inventory 332. For example, the routing system 302 may communicate with the second merchant inventory 332 using the second API 338 with the lead merchant inventory 306 and the second merchant inventory 332. In some instances, the routing system 302 may cause the user device 304 to display an indication of the second merchant inventory able to provide the one or more requested items.

In various circumstances, the routing system 302 may identify one or more stocked inventories 332 and/or 334 with the requested item based on the lead merchant inventory 306 and interfaces 336, 338, 340, 342, and/or 344, potentially leveraging existing API interfaces 336, 338, 340, 342, and/or 344, among other possible network resources for improving the search speed and search accuracy of the requested items. As noted, various searches may be performed with words detected with microphones, VoIP, images including captured images of stock keeping units (SKUs), universal product codes (UPCs), and/or international article numbers (EANs), possibly including multi-digit barcodes read with laser detection, among other possibilities.

Figure 3E:
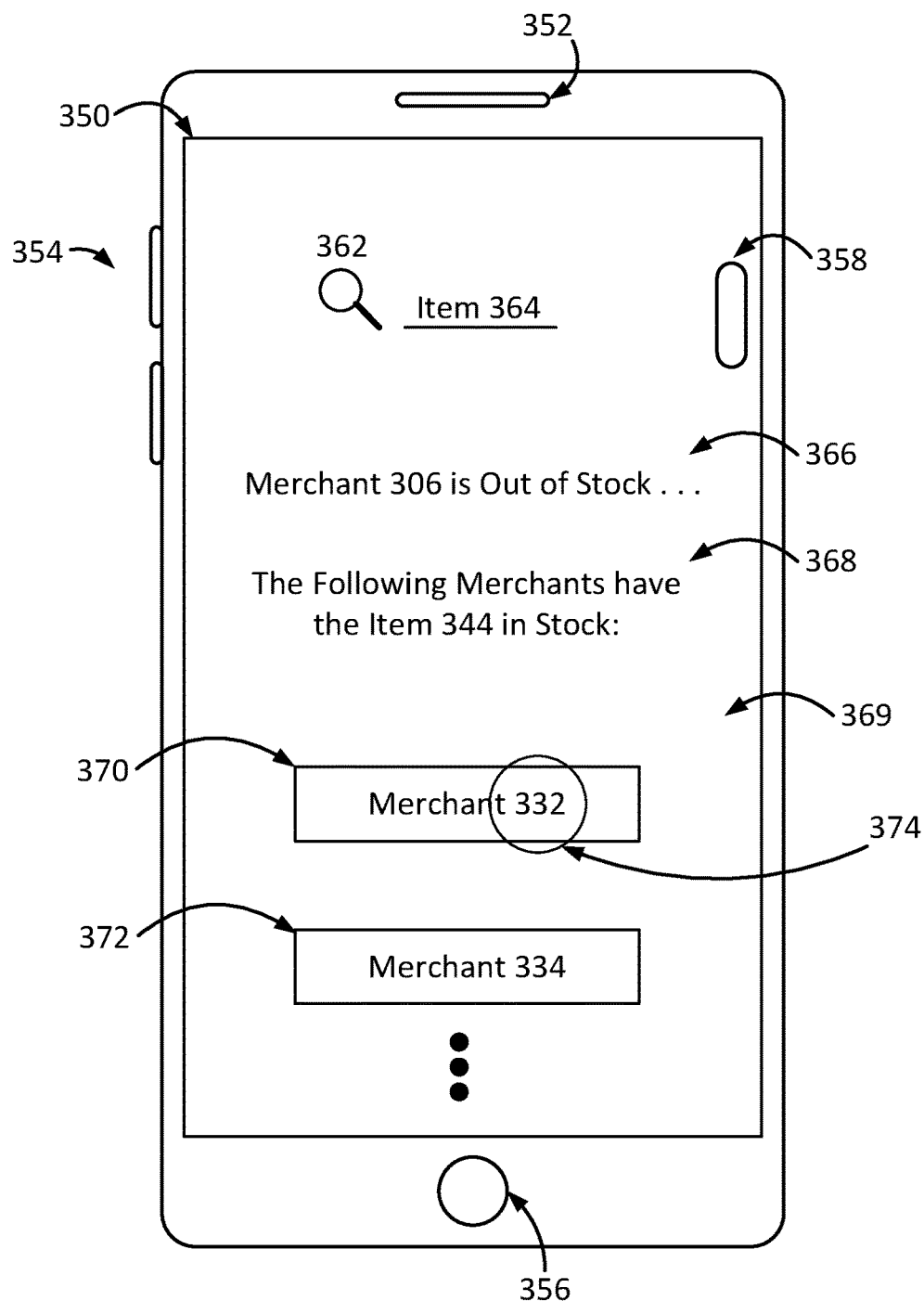
FIG. 3E illustrates an exemplary device, according to an embodiment.

FIG. 3E illustrates the exemplary device 304, according to an embodiment. In some instances, the device 304 may take the form of the user device 304 described above in relation to FIGS. 3A-3D. As shown, the device 304 may include the I/O interface 350, where the I/O interface 350 takes the form of the I/O interface 130 and/or the I/O interface 220 described above in relation to FIGS. 1-2E. In particular, the I/O interface 350 may include a touch-sense interface configured to detect one or more touch inputs from a user. Further, as shown, the user device 304 may include a speaker 352, one or more buttons 354, and/or a button 356. The button 356 may include a fingerprint sensor configured to detect and/or identify one or more fingerprints of the user, possibly to authenticate a transaction with the user device 304.

Further, as shown, the I/O interface 350 may display a search 362 for the requested item 364. In view of the scenarios above, the search 362 for the requested item 364 may indicate various words such as, "laptop with dual-core processors," "laptop with advanced graphics," and/or "laptop with 15 inch screens," among other possible words that describe the requested item 364, possibly with the search 362 capable of automatically filling and/or completing the search string. As noted, the search 362 may be performed with various images recognized with the user device 304, including the images of stock keeping units (SKUs), universal product codes (UPC), and/or international article numbers (EAN) including multi-digit barcodes read with laser detection, among other possibilities. In some instances, the routing system 302 may search for the item 364 with the lead inventory 306 associated with the one or more networks 308.

In some embodiments, the user device 304 may cause the lead inventory 306 to rank the one or more stocked inventories 332 and/or 334, among other possible stocked inventories. In some instances, the one or more stocked inventories 332 and/or 334 may be ranked based on the number of policy preferences associated with the request for the item described above. Further, a selection 374 of at least one stocked inventory 332 may be determined based on the ranking 369 of the one or more stocked inventories 332 and/or 334. In some embodiments, the routing system 302 may track a level of trust associated with the lead inventory 306 based on the lead inventory 306 providing the ranking 369 the one or more stocked inventories 332 and/or 334.

Figure 4:
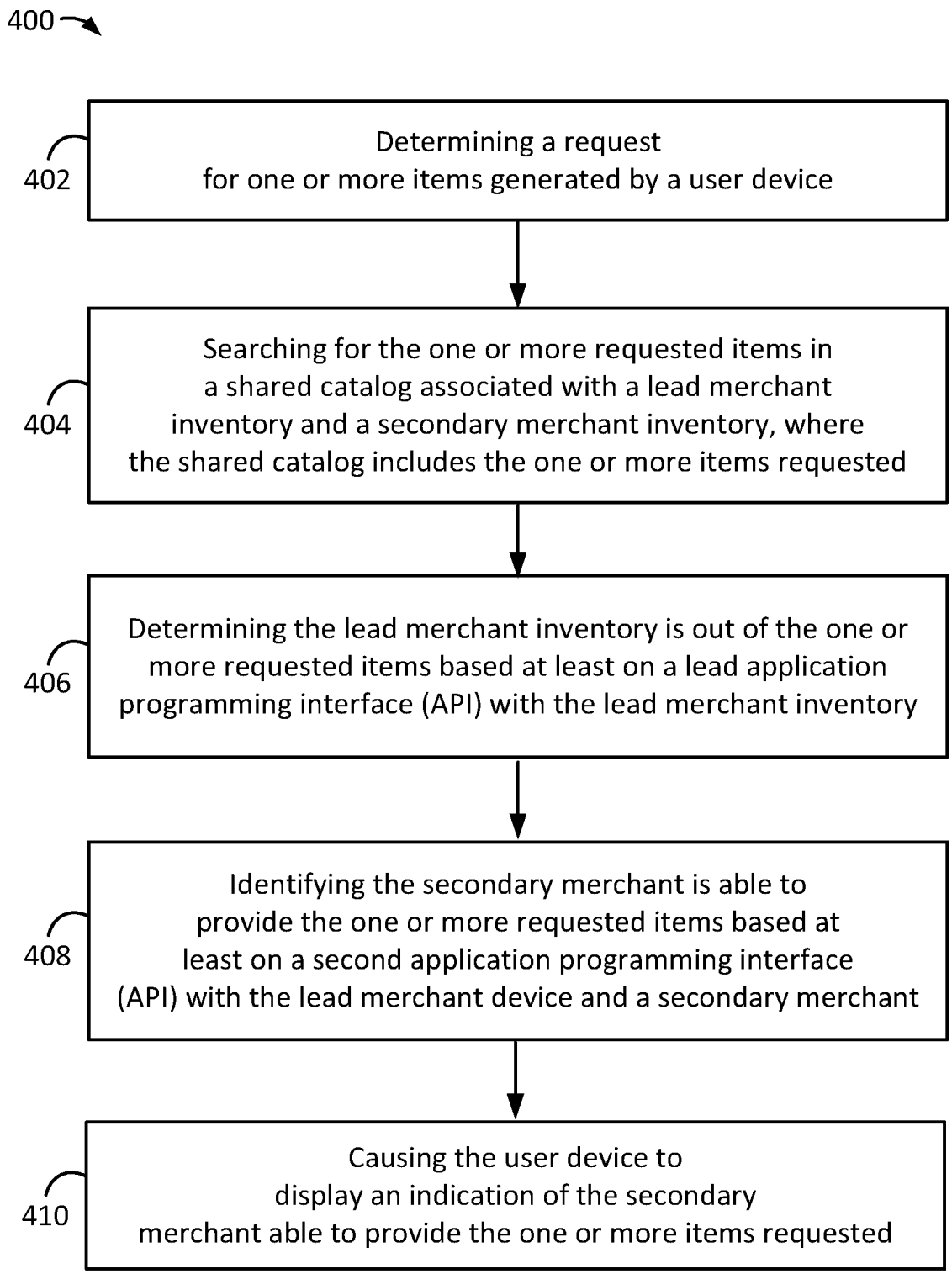
FIG. 4 illustrates an exemplary method, according to an embodiment.

FIG. 4 illustrates an exemplary method 400, according to an embodiment. The method 400 may be performed with the server 102, the routing device 202, the routing device 302, among other possible devices, systems, and/or combinations of such devices and/or systems described herein in relation to FIGS. 1-3E. Notably, one or more steps of the method 400 described herein may be omitted, performed in a different sequence, and/or combined with other methods for various types of applications contemplated herein, such as routing and/or shipping applications.

At step 402, the method 400 includes determining a request for one or more items generated by a user device. For example, referring back to FIGS. 3D-3E, the routing system 302 may determine the request for the one or more items 364 generated by the user device 304.

At step 404, the method 400 includes searching for the one or more requested items in a shared catalog associated with a lead merchant inventory and a second merchant inventory, where the shared catalog includes the one or more requested items. For example, the routing system 302 may search for the one or more items 364 in the shared catalog described above. In particular, the shared catalog, possibly stored with the catalog database 312, may be associated with a lead merchant inventory 306 and a second merchant inventory 332. For example, the shared catalog may be generated with data from the lead merchant inventory 306 and the second merchant inventory 332. In some instances, the shared catalog may indicate the one or more requested items 364. For example, the user device 304 may be configured to search 364 for the one or more items 364 in the catalog database 312.

At step 406, the method 400 may include determining the lead merchant inventory is out of the one or more requested items based at least on a lead application programming interface (API) with the lead merchant inventory. For example, the routing system 302 may determine the lead merchant inventory 306 is out of the one or more requested items 364 based at least on a lead API 336 with the lead merchant inventory 306.

At step 408, the method 400 may include identifying the second merchant inventory is able to provide the one or more requested items based at least on a second application programming interface (API) with the lead merchant inventory and the second merchant inventory. For example, the routing system 302 may identify the second merchant inventory 332 is able to provide the one or more requested items 364 based at least on a second application programming interface (API) 338 with the lead merchant inventory 306 and the second merchant inventory 332.

At step 410, the method 400 may include causing the user device to display an indication of the second merchant inventory able to provide the one or more requested items. For example, the routing system 302 may cause the user device 304 to display an indication, such as the notification 370, of the second merchant inventory 332 able to provide the one or more requested items 364.

In some embodiments, the method 400 may include the routing system 302 determining a third merchant inventory 334 able to provide the one or more requested items 364. For example, the routing system 302 may determine and/or identify the third merchant inventory 334 based on a third application programming interface (API) 340 with the lead inventory device 306 and the third merchant inventory 334. As such, the routing system 302 may cause the user device 304 to display an indication, such as the notification 372, of the third merchant inventory 334 able to provide the one or more requested items 364.

In some embodiments, in response to determining the lead merchant inventory 306 is out of the one or more requested items 364, the method 400 may include the routing system 302 searching for a number of merchant inventories 332 and/or 334, among other possible merchant inventories. For example, the routing system 302 may search for the number of merchant inventories 332 and/or 334 based on the shared catalog described above. Further, the second merchant inventory 334 may be identified based on searching for the number of merchant inventories 332, and/or 334, among the other possible merchant inventories.

In some embodiments, the one or more requested items 364 may correspond with one or more identification codes described above, possibly also referred to as provider product codes and/or PayPal product codes (PPC), other codes associated with a provider, such as PayPal, Inc. of San Jose, Calif., USA, among other potential codes. As noted, the PPC may be associated with universal stock keeping units (SKUs), universal product codes (UPCs), and/or international article numbers (EANs) including multi-digit barcodes, among other types of codes. For example, the PPC may be associated with such codes that indicate manufacturers of the items 364, descriptions of the items 364, materials used to manufacture the items 364, sizes associated with the items 364, colors of the items 364, packaging of the items 364, and/or warranties associated with the requested item 364. As such, the routing system 302 may search for the one or more requested items 364, possibly by searching with the one or more search engines 310 described above, for the one or more identification codes. Notably, the one or more identification codes may be stored and/or managed with the one or more catalog databases 312, potentially updating the shared catalogs in real-time based on data inputs received from the APIs 336, 338, 340, 342, and/or 344.

In some embodiments, the routing system 302 may place a hold on the one or more requested items 364 at the second merchant inventory 332 based on the second API 338 with the lead merchant inventory 306 and the second merchant inventory 332. For example, the hold may be placed by transmitting a hold instruction generated by the routing system 302 to the lead merchant inventory 306 over the API 336 and also to the second merchant inventory 332 over the API 338. As such, by utilizing the APIs 338 and/or 340, the routing system 302 may communicate with other second merchant inventories 332 and/or 334 without generating new APIs, thereby improving the system communication protocols. Further, the routing system 302 may confirm the one or more requested items 364 is shipped from the second merchant inventory 332 to a location associated with the user device 304 based at least on the second API 338.

In some embodiments, the method 400 may include the routing system 300 rating the one or more stocked merchants 332, possibly also referred to as the second merchant inventory 332, based on the second merchant inventory 332 shipping the one or more requested items 364 to a location associated with the user device 304. For example, the routing system 300 may rate the stocked merchants 332 based on responsiveness, the speed of delivering the one or more items 364 to the location of the user device 304, the method and/or quality of the delivery of the item 364, among other possible factors.

In some embodiments, the method 400 may include the routing system 300 generating respective APIs 342 and 344 with the second merchant inventory 332 and a third merchant inventory 334. As such, the routing system 300 may receive respective bids from the second merchant inventory 332 and the third merchant inventory 334 based on the respective APIs 342 and 344. For example, the routing system 300 may receive the respective bids based various attempts by the second merchant inventory 332 and the third merchant inventory 334 to satisfy the request by shipping the item 364. In some instances, the routing system 3000 may rank 369 the second merchant inventory 332 with the third merchant inventory 334 based on the respective bids received. As such, the user device 304 may display the indication, including the ranking 369 and the notifications 370 and 372, of the second merchant inventory 332 with the third merchant inventory 334 based at least on the ranking 369.

In some embodiments, one or more the systems 100, 200, and/or 300 may include a virtual warehouse database (VWD). In some instances, the VWD may take the form of other data storages and/or databases, such as the data storage 116, the database 312, and/or other data components associated with the systems 100, 200, and/or 300, among other possibilities. As such, the VWD may include variable depths, potentially identifying numerous items available around the world online and offline. In particular, the VWD may be accessed by various offline devices. Further, the VWD may be updated based on the offline devices gaining or regaining online connectivity to improve the accessibility of the VWD to various such devices and/or the compatibility with various such devices, including legacy devices. Yet further, the VWD may be structured based on a global catalog normalization (GCN). For example, the VWD may be compatible and/or normalized with various catalogs, secondary market catalogs, and/or catalog databases, such as catalog databases 312 described above. As such, the VWD may identify numerous items with the GCN normalization, possibly improving search speed, search efficiency, and optimizing the accuracy of the search results.

For example, the systems 100, 200, and/or 300 may determine a product code associated with a request for an item generated by a user device, such as the user device 304. Further, the systems 100, 200, and/or 300 search for the requested item with the VWD based on the determined product code. In particular, the systems 100, 200, and/or 300 may identify a lead inventory, such as the lead inventory 306, associated with the requested item based on searching for the requested item with the VWD. In some instances, the lead inventory 306 may be out of stock of the requested item. As such, the systems 100, 200, and/or 300 may identify one or more stocked inventories 332 and/or 334 that correspond with the identified lead inventory 306. For example, the systems 100, 200, and/or 300 may identify the one or more stocked inventories 332 and/or 334 based on the VWD, where the one or more stocked inventories 332 and/or 334 may be stocked with the requested item. Thus, the systems 100, 200, and/or 300 may cause the user device 304 to display one or more notifications 370 and/or 372 associated with the one or more stocked inventories 332 and/or 334.

Figure 5:
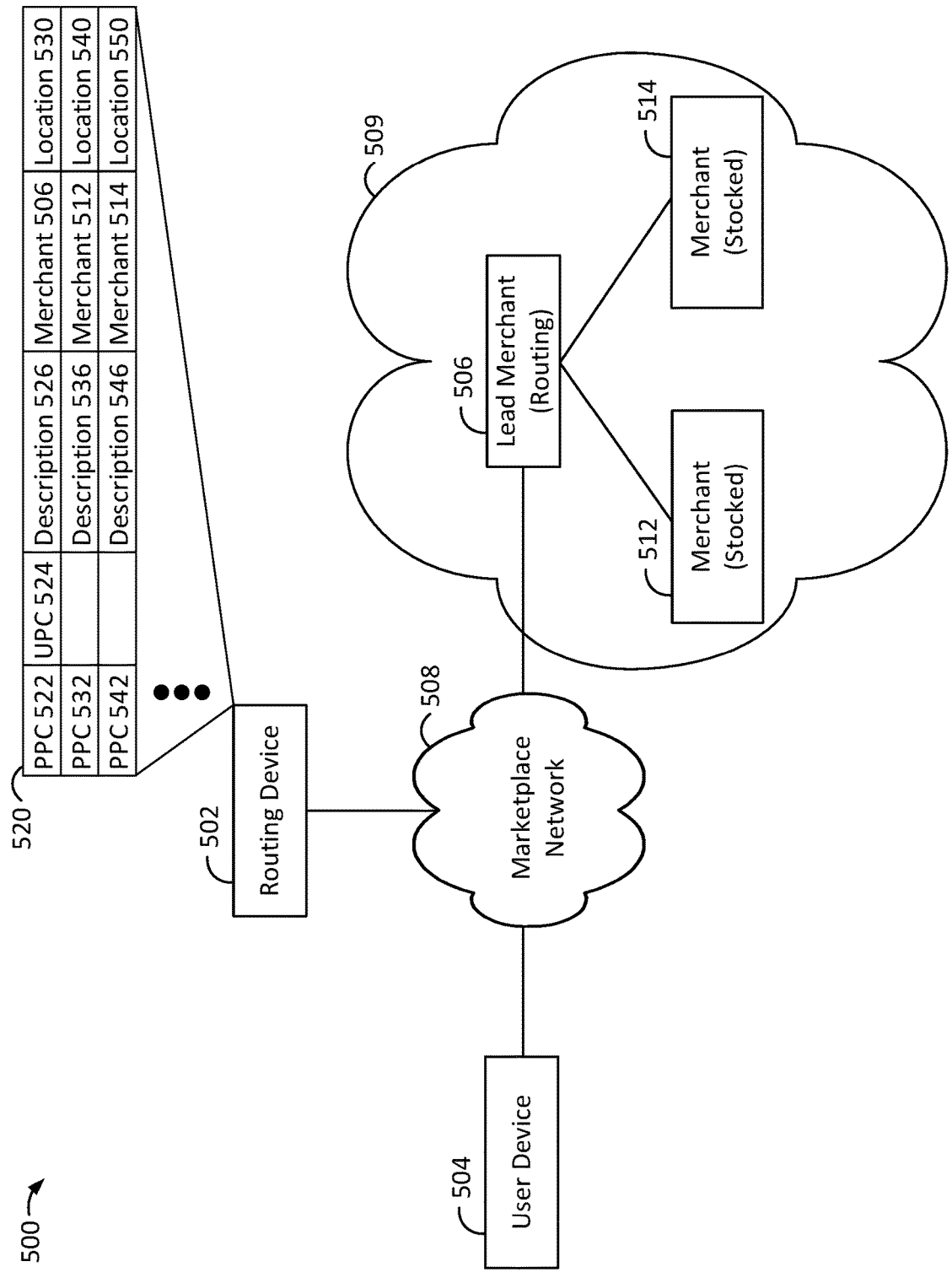
FIG. 5 illustrates an exemplary system with a virtual warehouse database, according to an embodiment.

FIG. 5 illustrates an exemplary system 500 with a virtual warehouse database (VWD) 520, according to an embodiment. Notably, the VWD 520 enables the system 500 to search and/or identify items without product codes, such as items without markings and/or tags with the product codes. For example, the VWD 520 may enable the system 500 to search and/or identify items without universal product codes (UPCs), codes associated with stock keeping units (SKUs), international article numbers (EAN), and/or other multi-digit barcodes, among other possibilities. For example, considering the scenarios above, the system 500 may receive a request for the shawl item, possibly where the request identifies the item with the UPC 524. Yet, as contemplated in the scenarios above, the merchant 506 that usually carries the shawl item with the UPC 524 may be out of stock of the shawl item.

Yet, the system 500 may identify one or more of such items stocked with merchants in India and/or China, such that the items may be identified without the items being tagged and/or marked with the product code described above. In particular, the system 500 may identify a first shawl item associated with the provider product code (PPC) 532 possibly in India and a second shawl item associated with the PPC 542 possibly in China. As such, the system 500 may identify the first and second shawl items with the VWD 520 based on the respective descriptions 536 and 546 that may be identical and/or similar to the description 526 of the requested shawl item associated with the UPC 524.

As shown, the VWD 520 may include various types of data. For example, the VWD may include the provider product codes (PPCs) 522, 532, 542, and/or the universal product code (UPC) 524. Further, the VWD 520 may include descriptions 526, 536, and/or 546, identifications of the merchants 506, 512, and/or 514, and/or locations 530, 540 and/or 550 possibly that correspond with the merchants 506, 512, and/or 514, respectively, among other forms of data contemplated with the ellipses shown. In some embodiments, the system 500 includes the routing device 502 that may take the form of the routing devices 102, 202, and/or 302 described above in relation to FIGS. 1-3E. The user device 504 may take the form of one or more of the user devices 104, 204, and/or 304 described above.

The lead merchant 506 may take the form of the lead merchants 206 and/or 306 described above. One or more of the marketplace networks 508 and/or 509 may take the form of the networks 208 and/or 209, respectively, described above in relation to FIG. 2D, among other networks 108, 308, 316, 318, and/or 320 also described above. The merchants 512 and/or 514 may take the form of the merchants 212 and/or 214, respectively. Further, the merchants 512 and/or 514 may take the form of the merchants 322 and/or 324, respectively. Yet further, the merchants 512 and/or 514 may take the form of the merchants 332 and/or 334, respectively. Notably, the system 500 may include a non-transitory memory, such as the memory 114. Further, the system 500 may include one or more hardware processors, such as the processors 112 coupled to the non-transitory memory 114 and configured to read instructions from the non-transitory memory 114 to cause the system 500 to perform operations.

In some embodiments, the system 500 may determine a product code, such as the product codes 522 and/or 524. In some instances, the product code 524 may take the form of a UPC, a code associated with SKUs, EANs, and/or multi-digit barcodes configured to be read with laser detection, among other possible codes described above. For example, the product code 524 may be a UPC and the UPC 524 may be associated with the provider product code (PPC) 522, as described above. As such, the product code 524, and further the product code 522, may be associated with a request for an item generated by the user device 504. For example, the description 526 of the requested item may also be associated with the product codes 522 and/or 524.

In some embodiments, the system 500 may search for the requested item with the VWD 520 based on the determined product code, such as the uniform product code 524 described above. As such, the system 500 may identify a lead inventory 506, possibly also referred to as the lead merchant 506, associated with the requested item based on searching for the requested item with the VWD 520. Yet further, the system 500 may identify the lead inventory 506 is out of stock of the requested item. As such, the system 500 may identify one or more stocked inventories 512 and/or 514, possibly also referred to as the merchants 512 and/or 514, with one or more stocked items that correspond with the requested item based on searching for the requested item with the VWD 520. In some instances, the system 500 may identify one or more stocked inventories 512 and/or 514 that correspond with the identified lead inventory 506 based on the VWD 520, possibly where the inventories 506, 512, and/or 514 are associated with one or more networks 509.

As noted, the one or more stocked inventories 512 and/or 514 may be stocked with the one or more items that correspond with the requested item, possibly where the stocked items are the same and/or similar to the requested item. As noted, the description 526 of the requested item may correspond with the descriptions 536 and/or 546 of the stocked items, possibly where the descriptions 526, 536, and/or 546 include the same and/or similar terms, such as "cashmere," "shawl," and/or "paisley," among other possibilities. Yet, as noted with the scenarios above, the one or more stocked items may be identified without being tagged and/or marked with the determined product code. As such, the system 500 may cause the user device 504 to display one or more notifications. For example, consider that the user device 504 takes the form of the user device 304 described above, such that the user device 504 displays the notifications 370 and/or 372, where the notifications 370 and/or 372 are associated with the one or more stocked inventories 512 and/or 514, respectively.

In some embodiments, the system 500 may determine a selection, such as the selection 374 described above. For example, consider that the merchant 332 corresponds to the stocked inventory 512 and the merchant 334 corresponds to the stocked inventory 514. In such instances, the system 500 may determine the selection 374 of the notification 370 from the one or more notifications 370, 372, and/or other possible notifications of merchants contemplated with the ellipses in FIG. 3E. The selection 374 may be determined based on a user input received with the user device 504. In response, the system 500 may deliver the one or more stocked items from the locations 540 and/or 550 of the one or more stocked inventories 512 and/or 514, respectively, to a location associated with the user device 504 based on the selection 374 of the notification 370. For example, the location associated with the user device 504 may be the location 530 of the lead inventory 506.

In some embodiments, the determined product code 524 of the requested item may, for example, take various other forms in addition to the UPC. For example, the product code 524 may take the form of other product codes described above, such as a code associated with SKUs, EANs, and/or multi-digit barcodes. As such, the system 500 may identify the lead inventory 506 based on various forms of the product code 524. In some instances, the system 500 may search for the requested item with the VWD 520 based on the product code 524. As shown, the system 500 may search the VWD 520 to identify the requested item that corresponds with the lead inventory 506. Further, as noted, the lead inventory 506 may correspond with the description 526 of the requested item, possibly indicating the manufacturers of the item, descriptions of the item, materials used to manufacture the item, sizes associated with the item, colors of the item, packaging of the item, and/or warranties associated with the item. As noted, the one or more stocked inventories 512 and/or 514 may be identified based on the description 526 of the requested item. For example, as described above, the description 526 may correspond with the descriptions 536 and/or 546 of the respective items stocked with the respective stocked inventories 512 and/or 514.

In some embodiments, the system 500 may determine various types of information regarding the one or more stocked inventories 512 and/or 514 with the VWD 520. For example, the system 500 may determine the locations 540 and/or 550 of the one or more stocked inventories 512 and/or 514, respectively. Based on the scenarios above, the system 500 may determine the location 540 to be in Bangalore, India and the location 550 may be in Hong Kong, China, among other possibilities based on various geographic locations around the world. Further, the system 500 may determine the respective locations 540 and/or 550 are associated with respective distances to a location of the user device 504. As such, the system 500 may identify a particular stocked inventory 512 from the one or more stocked inventories 512, 514, and/or other inventories to deliver the one or more stocked items to the location associated with the user device 504 based on the respective distances to the location of the user device 504, where the location of the user device 504 may be the location 530, as contemplated above.

In some embodiments, the VWD 520 may include one or more secondary market catalogs associated with the one or more networks 509, possibly including one or more secondary marketplace networks that may be referred to as secondary marketplace networks 509. As noted, the system 500 may retrieve the one or more secondary market catalogs from the one or more networks 509, possibly from the inventory 506. As such, the system 500 may search for the requested item with the one or more secondary market catalogs. In such instances, the one or more stocked inventories 512 and/or 514 may be identified based on the requested item searched with the one or more secondary market catalogs.

In some embodiments, the system 500 may determine various ratings with the VWD 520. For example, the system 500 may determine a respective rating for each of the one or more stocked inventories 512 and/or 514, possibly based on respective user ratings received from various users of the one or more stocked inventories 512 and/or 514. In particular, the respective rating for each of the one or more stocked inventories 512 and/or 514 may be based on users that receive items from the inventories 512 and/or 514. Further, the system 500 may determine the respective rating for each of the one or more stocked inventories 512 and/or 514, possibly based on merchant ratings received from various merchants associated with the one or more stocked inventories 512 and/or 514. In particular, the respective rating for each of the one or more stocked inventories 512 and/or 514 may be based on merchants that receive items from and/or send items to the inventories 512 and/or 514. In addition, the system 500 may identify at least one stocked inventory 512 from the one or more stocked inventories 512, 514, and/or other inventories, wherein the stocked inventory 512 may be identified to deliver the one or more stocked items to a location associated with the user device 504, possibly the location 530 of the inventory 506. Notably, the location 530 may be closer to the location 540 than the location 550. Yet further, the stocked inventory 512 may be identified based on the respective user ratings and/or the respective merchant ratings determined for the stocked inventory 512.

In some embodiments, the system 500 may determine one or more of the stocked inventories 512, 514, and/or other stocked inventories are able to deliver the one or more stocked items based on the on the VWD 520. For example, the system 500 may select at least one stocked inventory 512 from the one or more stocked inventories 512, 514, and/or other stocked inventories able to deliver the one or more stocked items from the location 540 associated with the stocked inventory 512 to a location associated with the user device 504, such as the location 530 of the inventory 506. Further, the system 500 may track compensation in the VWD 500 for each segment of a distance the one or more stocked items travels from the location 540 of the stocked inventory 512 to the location 530 associated with the user device 504.

Figure 6:
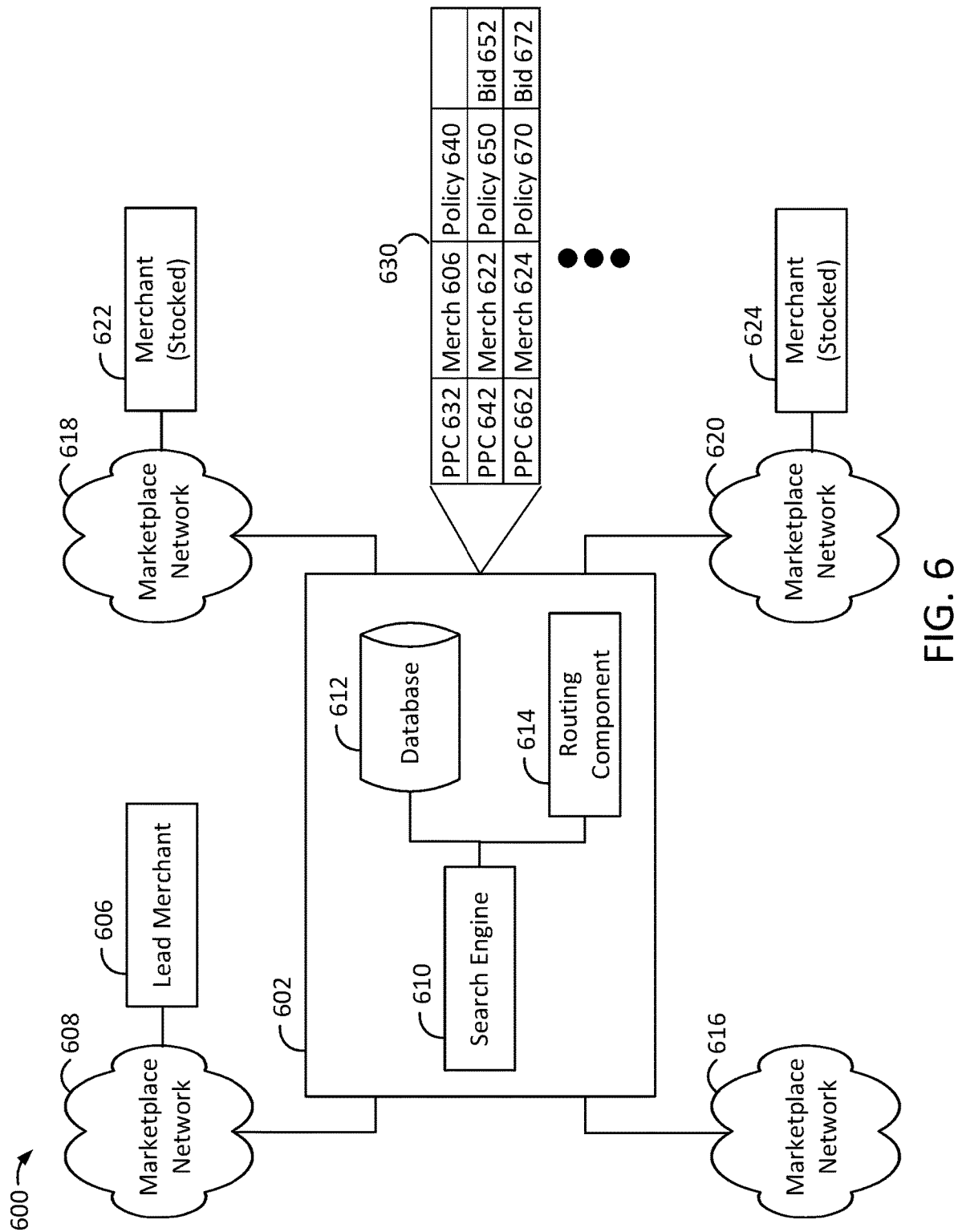
FIG. 6 illustrates an exemplary system with a virtual warehouse database associated with various networks, according to an embodiment.

FIG. 6 illustrates an exemplary system 600 with a virtual warehouse database (VWD) 630 associated with various networks 608, 616, 618, and/or 620, according to an embodiment. As shown, the router device 602, possibly also referred to the routing system 602, may take the form of one or more routing systems 102, 202, 302, and/or 502 described above in relation to FIGS. 1-5. The search engine 610, the database 612, and/or the routing component 614 may take the form of the search engine 310, the database 312, and/or the routing component 314, respectively described above in relation to FIGS. 3A-5.

Further, the lead merchant 606, possibly also referred to as the first merchant inventory 606, may take the form of the inventories 206, 306, and/or 506 described above in relation to FIGS. 2A-5, among other inventories potentially out of stock of one or more requested items. Further, the merchants 622 and/or 624 may take the form of the merchants 322 and/or 324, respectively, as described above in relation to FIG. 3C. Further, the marketplace networks 608, 616, 618, and/or 620 may take the form of the marketplace networks 308, 316, 318, and/or 320, respectively, as described above in relation to FIG. 3C.

Yet further, the VWD 630 may take the form of the VWD 520, such that the VWD 630 enables the system 600 to search and identify items without product codes, such as items without UPCs, codes associated with SKUs, EANs, and/or multi-digit barcodes, as described above. In some instances, the provider product codes (PPCs) 632, 642, and/or 662 may take the form of the PPCs 522, 532, and/or 542, respectively. Notably, the merchants 606, 622, and/or 624 may correspond with the policies 640, 650, and/or 670, respectively. In addition, the merchants 622 and/or 624 may correspond with the bids 652 and/or 672, respectively. Thus, the VWD 630 may include various forms of data contemplated with the ellipses shown, such as the data from the VWD 520 described above. Notably, the system 600 may include one or more hardware processors, such as the processors 112, coupled to the non-transitory memory 114, possibly also referred to as a non-transitory machine-readable medium 114. The non-transitory machine-readable medium 114 may have stored thereon machine-readable instructions executable to cause a machine, such as the system 600, to perform operations described herein.

In some embodiments, the system 600 may determine a request for an item generated by a user device, such as the user device 304 described above in relation to FIG. 3E. Further, the system 600 may search for the requested item with the VWD 630 based on the number of policy preferences associated with the request for the item. The system 600 may identify the first inventory 606 associated with the requested item based on the number of policy of preferences 640. Further, the system 600 may identify the first inventory 606 is out of stock of the requested item. As such, the system 600 may identify the one or more stocked inventories 622 and/or 624 that correspond with the identified first inventory 606 based on the VWD 630. For example, the PPCs 632, 642, and/or 662 may correspond to the requested item in the VWD 630, possibly where the PPCs 632, 642, and/or 662 indicate the same or similar items. As such, the one or more stocked inventories 622 and/or 624 may be able to provide the requested item, possibly based on the respective bids 652 and/or 672. Yet further, the system 600 may cause the user device 304 to display one or more notifications, such as the notification 370 and/or 372, associated with the one or more stocked inventories 622 and/or 624.

In some embodiments, the system 600 may determine various marketplace networks 618 and/or 620 from the VWD 630, where the networks 618 and/or 620 may be associated with the stocked inventories 622 and/or 624, respectively. As noted above, the generated request may indicate the various policy preferences 650 and/or 670. Thus, the marketplace networks 618 and/or 620 may correspond with the number of policy preferences 650 and/or 670, respectively, in the VWD 630. For example, the networks 618 and/or 620 may deliver stocked items based on the agreements, arrangements, and/or practices identified with the policy preferences 650 and/or 670, respectively. As such, the system 600 may identify the one or more stocked inventories 622 and/or 624 based on the respective marketplace networks 618 and/or 620 associated with the one or more stocked inventories 622 and/or 624, respectively.

In some embodiments, the system 600 may determine the respective bids 652 and/or 672 from the VWD 630, where the bids 652 and/or 672 are determined from each of the one or more stocked inventories 622 and/or 624, respectively. Further, the respective bids 652 and/or 672 may be based on the one or more stocked inventories 622 and/or 624, respectively, able to deliver the requested item from the one or more stocked inventories 622 and/or 624 to a location associated with the user device, such as the location 530 associated with the user device 504 described above. Further, the system 600 may identify at least one stocked inventory 622 from the one or more stocked inventories 622, 624, and/or other inventories able to deliver the requested item to the location 530 associated with the user device 504 based on the respective bid 652 from the stocked inventory system 622.

In some embodiments, the system 600 may determine various types of policies 640, 650 and/or 670 from the VWD 630, such as the agreement policies associated with transactions for the requested item, a number of fees, e.g., stocking fees and/or inventory fees, partners or other entities associated with the agreements, various limitations of the transaction for the requested item, and/or liabilities as described above. For example, the system 600 may determine the respective policies 650 and/or 670 of the stocked inventories 622 and/or 624 to deliver the requested item, possibly based on packaging the item, and/or warranties associated with delivering the item. Further, the system 600 may determine the number of policy preferences 640 associated with the request for the item corresponds with the respective policies 650 and/or 670. As such, the system 600 may identify the one or more stocked inventories 622 and/or 624 based on the number of policy preferences 640 determined to correspond with the respective policies 650 and/or 670.

In some embodiments, the system 600 may determine various confirmations with VWD 630. For example, the system 600 may determine a confirmation from at least one stocked inventory 622 from the one or more stocked inventories 622, 624, and/or other stocked inventories to provide the requested item based on the number of policy preferences 640. The system 600 may cause the stocked inventory 622 to deliver the requested item to a location 530 associated with the user device 540 based on the confirmation.

In some embodiments, the system 600 may determine various rankings with the VWD 630. For example, the system 600 may determine a ranking of the one or more stocked inventories 622, 624, and/or other stocked inventories based on the number of policy preferences 640 associated with the request for the item. As shown, for example, the ranking may provide the inventory 606, in addition to the inventory 622, and further in addition to the inventory 624, possibly amongst other inventories contemplated with the ellipses shown in FIG. 6. Further, consider that the merchants 622 and/or 624 correspond with the merchants 332 and/or 334, respectively, as described above. In such instances, the system 600 may determine a selection, such as the selection 374, of at least one stocked inventory 622 from the one or more stocked inventories 622, 624, and/or other stocked inventories based on the ranking of the one or more stocked inventories 622, 624, and/or the other stocked inventories.

In some embodiments, the system 600 may determine various levels of trust associated with the merchants 606, 622, and/or 624, possibly from the VWD 630. Yet further the system 600 may determine levels of trust associated with the marketplace networks 608, 616, 618, and/or 620, among other networks. For example, the system 600 may determine a level of trust associated with the first inventory 606, possibly based on the first inventory 606 associated with the one or more stocked inventories 622, 624, and/or other stocked inventories. Further, the system 600 may determine a level of trust associated with the first inventory 606, possibly based on the first inventory 606 ranking the one or more stocked inventories 622, 624, and/or other stocked inventories. Yet further, the system 600 may store the determined level of trusts with the VWD 630. For example, the system 600 may store respective levels of trust that correspond with each of the merchants 606, 622, and/or 624, amongst other merchants as contemplated with the ellipses shown in FIG. 6.

In some embodiments, the system 600 may determine various countries associated with the merchants 606, 622, and/or 624, possibly from the VWD 630. For example, the system 600 may determine a respective country associated with each of the one or more stocked inventories 622, 624, and/or other stocked inventories, possibly respective countries where the one or more stocked inventories 622, 624, and/or other stocked inventories are located. In some instances, the respective countries may be associated with respective distances to a location of the user device, such as the location 530 of the user device 504 described above. As such, the system 600 may identify at least one stocked inventory 622 from the one or more stocked inventories 622, 624, and/or other stocked inventories able to deliver the requested item to the location 530 associated with the user device 504 based on the respective distances to the location 530.

Figure 7:
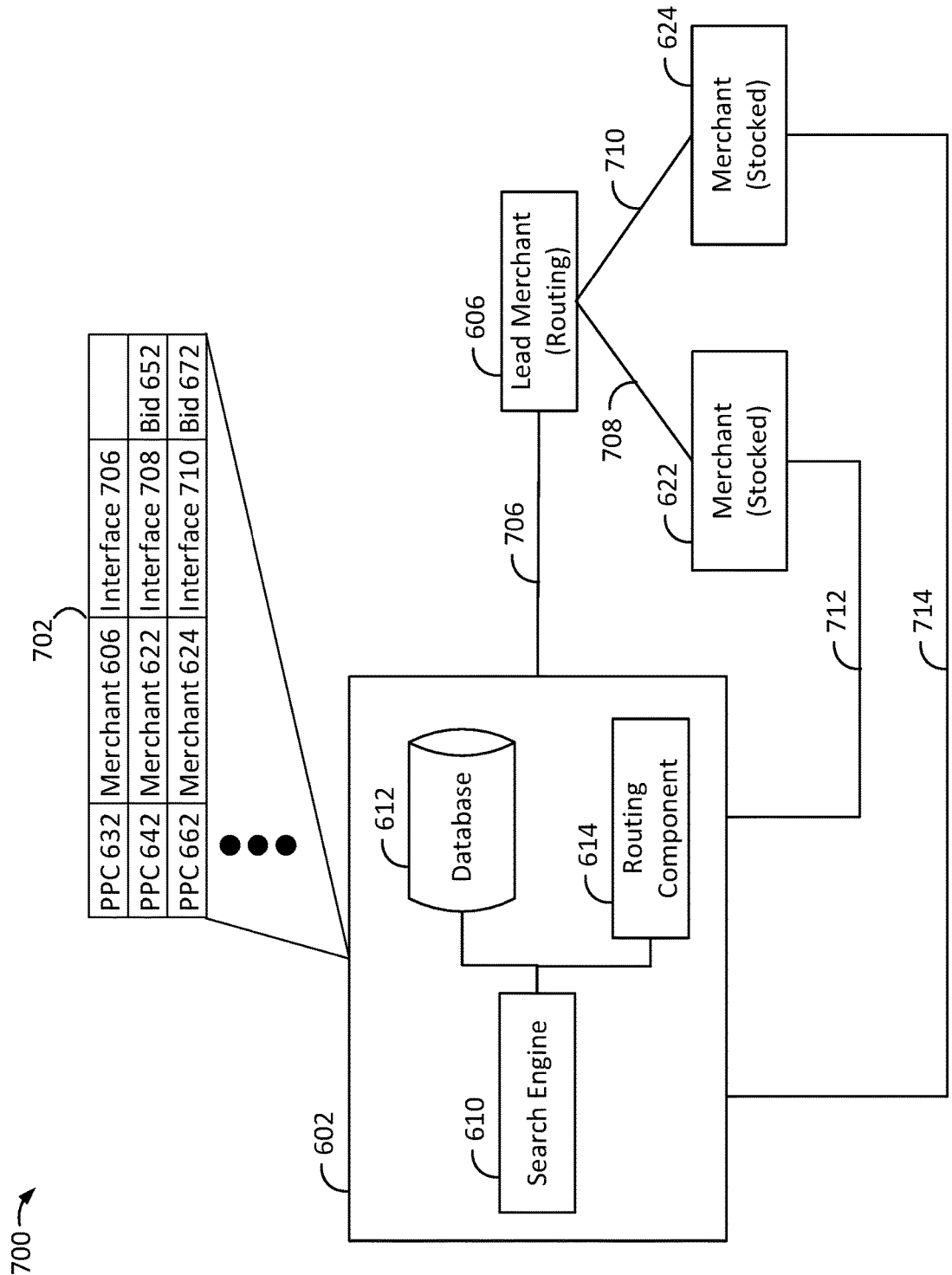
FIG. 7 illustrates an exemplary system with a virtual warehouse database associated with various interfaces, according to an embodiment.

FIG. 7 illustrates an exemplary system 700 with a virtual warehouse database 702 associated with various interfaces 706, 708, 710, 712, and/or 714, according to an embodiment. As shown, the system 700 may include the router device 602, possibly also referred to the routing system 602 described above. Further, the system 700 may include the lead merchant 606, possibly also referred to as the first merchant inventory 606 described above. Yet further, the system 700 may include the merchants 622 and/or 624, possibly also referred to as the one or more stocked inventories 622 and/or 624 described above. Yet further, the system 700 may include the interfaces 706, 708, 710, 712, and/or 714 that may take the form of the interfaces 336, 338, 340, 342, and/or 344, respectively, as described above in relation to FIG. 3D.

As shown, the system 700 may include the VWD 702, where the VWD 702 may also include the provider product codes (PPCs) 632, 642, 662, and/or other PPCs associated with other items as contemplated with ellipses. Further, the VWD 702 may include indications of the inventories 606, 622, 624, and/or other inventories as contemplated with ellipses. Yet further, the VWD may include indications of the interfaces 706, 708, 710, 712, and/or 714 described above. In addition, the VWD 702 may include the bids 652, 672, and/or other bids as contemplated with ellipses. Thus, the VWD 702 may include various forms of data contemplated with the ellipses shown, such as the data from the VWD 520 and/or 630. Notably, the VWD 702 may be included with one or more of the search engines 610, the database 612, and/or the routing component 614, among other components of the routing device 602.

In some embodiments, the system 700 may determine a request for one or more items generated by a user device, such as the user device 304 described above. Further, the system 700 may search for the one or more requested items with the VWD 720 based on the determined request. The system 700 may identify the first inventory 606 associated with one or more application programming interfaces (APIs) 706, 708, 710, 712, and/or 714 based on searching for the one or more items with the VWD 702. In some instances, the first inventory 606 may be out of stock of the one or more requested items. As such, the system 700 identifying one or more stocked inventories 622 and/or 624 able to provide the requested item based on the first inventory 606 associated with the one or more APIs 706, 708, 710, 712, and/or 714. As such, the system 700 may cause the user device 304 to display an indication of the one or more stocked inventories 622 and/or 624 able to provide the one or more requested items.

Figure 8:
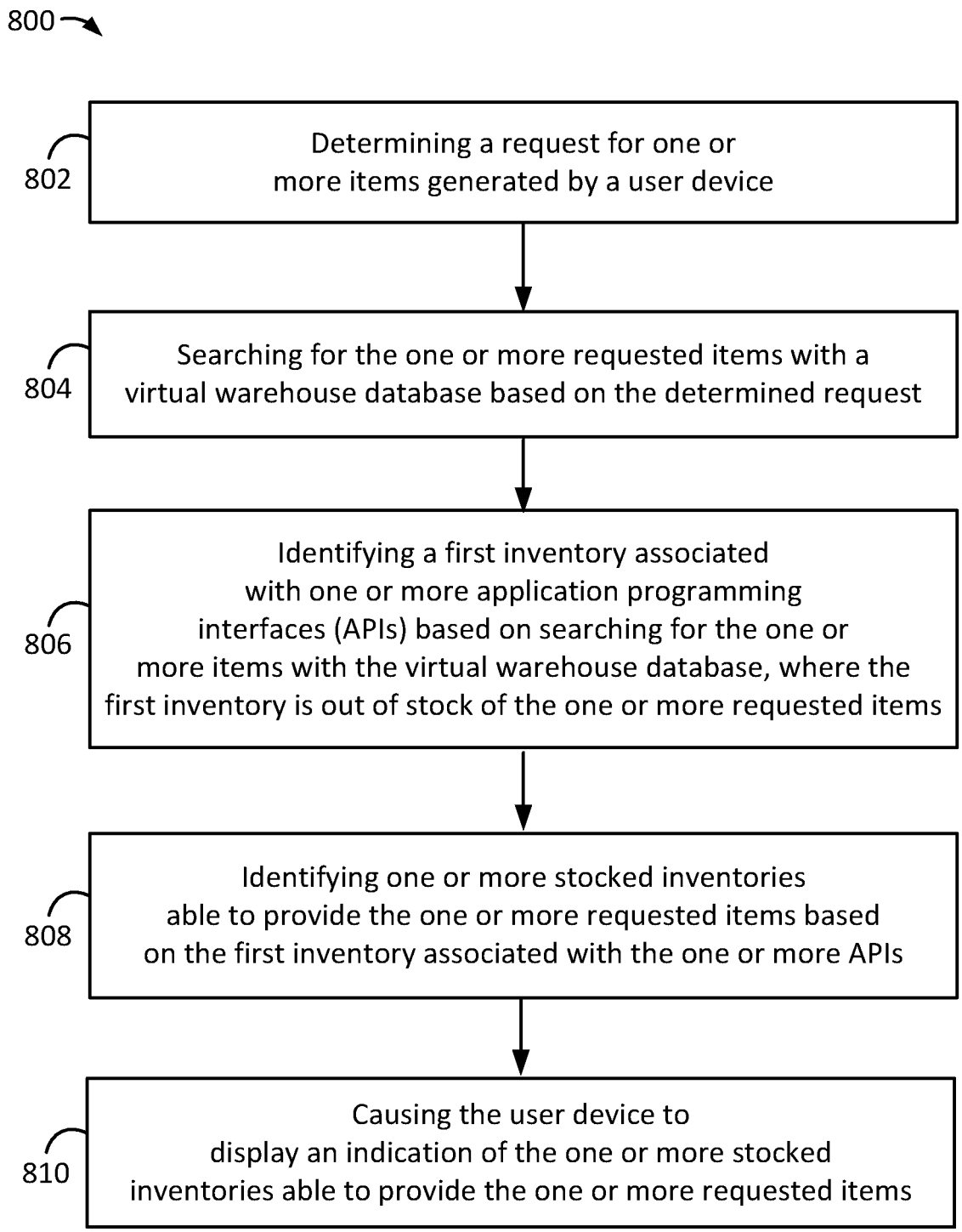
FIG. 8 illustrates an exemplary method, according to an embodiment.

FIG. 8 illustrates an exemplary method 800, according to an embodiment. The method 800 may be performed with the server 102, the routing devices 202, 302, 502, and/or 602, among other possible devices, systems, and/or combinations of such devices and/or systems described herein in in relation to FIGS. 1-7. Notably, one or more steps of the method 800 described herein may be omitted, performed in a different sequence, and/or combined with other methods for various types of applications contemplated herein, such as routing and/or shipping applications.

At step 802, the method 800 may include determining a request for one or more items generated by a user device. For example, the request may be generated by the user device 304 based on the search 362 for the item 364 described above in relation to FIG. 3E.

At step 804, the method 800 may include searching for the one or more requested items with a virtual warehouse database based on the determined request. For example, the method 800 may include searching for one or more items may be with the VWD 702 described above based on the determined request.

At step 806, the method 800 may include identifying a first inventory associated with one or more application programming interfaces (APIs) based on searching for the one or more items with the virtual warehouse database, where the first inventory is out of stock of the one or more requested items. For example, the method 800 may include identifying the first inventory 606 associated with one or more APIs 706, 708, 710, 712, and/or 714, possibly based on searching for the one or more items with the VWD 702, where the first inventory 606 is out of stock of the one or more requested items.

At step 808, the method 800 may include identifying one or more stocked inventories able to provide the requested item based on the first inventory associated with the one or more APIs. For example, the method 800 may include identifying one or more stocked inventories 622 and/or 624 able to provide the requested item based on the first inventory 606 associated with the one or more APIs 706, 708, 710, 712, and/or 714.

At step 810, the method 800 may include causing the user device to display an indication of the one or more stocked inventories able to provide the one or more requested items. For example, the method 800 may include causing the user device 304 to display an indication of the one or more stocked inventories 332 and/or 334. For example, referring back to FIG. 7, the one or more stocked inventories 332 and/or 334 may correspond to the one or more stocked inventories 622 and/or 624 able to provide the one or more requested items 364.

In some embodiments, the VWD 702 may identify various interfaces, such as the APIs 706, 708, 710, 712, and/or 714. For example, the VWD 702 may identify the APIs 708 and/or 710, possibly referred to as one or more second APIs 708 and/or 710 associated with the one or more stocked inventories 622 and/or 624, respectively. In some instances, the method 800 may include determining the first inventory 606 corresponds to the one or more second APIs 708 and/or 710. As such, the one or more stocked inventories 622 and/or 624 may be identified based on the first inventory 606 that corresponds to the one or more second APIs 708 and/or 710.

In some embodiments, the VWD 702 may identify various bids, such as the bids 652, 672, and/or other bids contemplated with the ellipses shown. For example, the method 800 may include determining respective bids 652 and/or 672 generated by the one or more stocked inventories 622 and/or 624, respectively, based on the one or more second APIs 708 and/or 710. As such, the method 800 may include updating the VWD 702 based on the respective bids 652 and/or 672 determined with the one or more second APIs 708 and/or 710.

In some embodiments, the method 800 may include placing a hold on the one or more requested items, such as the one or more requested items 364 described above in relation to FIG. 3E. Further, the hold may be placed at the one or more stocked inventories 622 and/or 624 based on the one or more second APIs 708 and/or 710, respectively. Further, the method 800 may include confirming the one or more requested items 364 is delivered from the one or more stocked inventories 622 and/or 624 to a location. For example, referring back to FIG. 5, the one or more requested items 364 may be delivered to the location 530 associated with the user device 504 based on the one or more second APIs 708 and/or 710.

In some embodiments, the one or more stocked inventories 622 and/or 624 may be referred to as a first stocked inventory 622 associated with a first API 708 and a second stocked inventory 624 associated with a second API 710. In some instances, the method 800 may include determining from the VWD 702 that the first inventory 622 corresponds with the first API 708 and the second API 710. As such, the one or more stocked inventories 622 and/or 624 may be identified to include the first stocked inventory 622 and the second stocked 624 inventory based on the first inventory 606 that corresponds to with the first API 708 and the second API 710.

In some embodiments, the system 702 may generate APIs 708, 710, 712, and/or 714, among various other APIs with the one or more stocked inventories 622 and/or 624. For example, the system 700 may generate respective APIs 712 and/or 714 with the second merchant inventory 622 and the third merchant inventory 624. As such, the system 702 may receive the respective bids 652 and 672 from the second merchant inventory 622 and the third merchant inventory 624 based on the respective APIs 712 and 714. Yet further, the system 702 may rank the second merchant inventory 622 with the third merchant inventory 624 based on the respective bids 652 and 672 received. As noted, referring back to FIG. 3E, and the user device 304 may display the indication of the second merchant inventory 622 with the third merchant inventory 624 based on the ranking, such as the ranking 369 described above.

In some embodiments, referring back to FIGS. 5-8, the systems 500, 600, and/or 700 may build, maintain, and/or modify the VWDs 520, 630, and/or 702, among other types of databases contemplated herein. For example, the systems 500, 600, and/or 700 may determine and/or identify one or more items, such as items that are available from the inventories 506, 512, 514, 606, 622, and/or 624 described above, among other possible sources. In some instances, the systems 500, 600, and/or 700 may also determine and/or identify available items from the networks 508, 509, 608, 616, 618, and/or 620 described above, amongst other possible networks. In some embodiments, the systems 500, 600, and/or 700 may build the VWDs 520, 630, and/or 702, possibly by adding additional items identified. As such, the systems 500, 600, and/or 700 may sort, categorize, and/or classify the items added, possibly based on the ingestion of data retrieved over various interfaces, such as the interfaces 712 and/or 714, and possibly the interfaces 706, 708, and/or 710.

In some embodiments, the systems 500, 600, and/or 700 may generate respective descriptions of each item, such as the descriptions 526, 536, and/or 546 described above. In some instances, the descriptions 526, 536, and/or 546 may be determined from the merchants 506, 512, 514, 606, 622, and/or 624 described above, amongst the other merchants and/or inventories contemplated herein. Yet further, the descriptions 526, 536, and/or 546 may be determined from the networks 508, 509, 608, 616, 618, and/or 620 described above, amongst other possible networks. In some instances, the systems 500, 600, and/or 700 may modify the descriptions 526, 536, and/or 546, possibly based on various inputs. For example, the descriptions 526, 536, and/or 546 may be modified based on inputs from the merchants 506, 512, 514, 606, 622, and/or 624, and also the networks 508, 509, 608, 616, 618, and/or 620 described above. Further, the descriptions 526, 536, and/or 546 may be modified based on data transmitted over interfaces, such as the interfaces 712 and/or 714, and possibly the interfaces 706, 708, and/or 710. As such, the descriptions 526, 536, and/or 546 may be modified based on the ingestion of data retrieved over various such interfaces 706-714.

In some instances, the systems 500, 600, and/or 700 may modify the descriptions 526, 536, and/or 546 based on various searches, such as the search 232 with the user device 204, the search 362 with the user device 304, and/or searches performed with other devices, such as client devices 104 and/or 106 described above. As such, in some instances, the systems 500, 600, and/or 700 may modify, adapt, and/or alter the descriptions 526, 536, and/or 546 based on searches from numerous devices, possibly millions of active users that may perform the searches. In particular, the descriptions 526, 536, and/or 546 may be modified to increase the probability of the searches 232, 362, and/or the other searches providing results desired by the users, thereby improving search speed, efficiency, and accuracy.

For example, considering the scenarios above, the search 232 may indicate the words, "cashmere shawl," the search 362 may indicate the words, "shawl with cashmere wool," and/or the other searches performed with the client devices 104 and/or 106 may indicate, "cashmere scarf" or "scarf with cashmere," among other possible words that describe the requested item 234. As such, the systems 500, 600, and/or 700 may modify the descriptions 526, 536, and/or 546 based on the words indicated, possibly to include the words in the descriptions 526, 536, and/or 546, possibly based on global catalog normalization (GCN) hierarchies including search trees with data structures configured to locate the items. As such, various combinations of the words, such as "shawl," "cashmere," "wool," "scarf," and/or the ordering of the words in one or more other searches providing the results desired by the users.

In some embodiments, the systems 500, 600, and/or 700 may modify the descriptions 526, 536, and/or 546 based on various lexicons, vocabulary trends, colloquialisms, languages used in relation to particular activities or groups, and/or languages associated with various regions around the world, among other possibilities. For example, the system 500 may determine searches from the marketplace network 616 of a first country (e.g., Australia) with the word, "shades," particularly referring to polarized sunglasses. Further, the system 500 may determine searches from the marketplace network 618 of a second country (e.g., the United States) with the word, "sunglasses," also referring to the polarized sunglasses. Yet further, the system 500 may determine searches from the marketplace network 620 of a specific geographic area (e.g., the city of Boston) in the United States with the word, "glares," also referring to the polarized sunglasses. As such, the system 500 may modify the descriptions 526, 536, and/or 546 based on the searches from the different geographic areas to ensure accurate search results in these different geographic areas. As such, the system 500 may identify the polarized sunglasses requested based on searches with any of the terms, "shades," "sunglasses," and/or "glares" in each of the different geographic locations. In addition, the system 500 may automatically suggest the polarized sunglasses based on the search terms.

In some embodiments, the systems 500, 600, and/or 700 may determine and/or assign a respective provider code for each item identified, where each of the systems 500, 600, and/or 700 may identify the respective items with the assigned provider codes. For example, the system 500 may assign the provider codes 522, 532, and/or 542 with the descriptions 526, 536, and/or 546, respectively, possibly based on the modifications to the descriptions 526, 536, and/or 546 described above.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A method for execution by a routing system comprising one or more hardware processors, the method comprising:
   determining, by the routing system, a request for one or more items generated by a user device;
   generating, by the routing system, a search query for a first merchant inventory and a second merchant inventory based on a geographic characteristic associated with the one or more requested items;
   determining, by the routing system, a language modification of the search query for each of the first merchant inventory and the second merchant inventory based on the geographic characteristic and a lexicon associated with each of the first merchant inventory and the second merchant inventory;
   modifying, by the routing system, the search query for each of the first merchant inventory and the second merchant inventory based on the language modification;
   searching, by the routing system using the request for the one or more requested items from a first merchant associated with the first merchant inventory and a second merchant associated with the second merchant inventory, for the one or more requested items with the first merchant inventory and the second merchant inventory based on the modified search query;
   determining, by the routing system, the first merchant inventory is out of the one or more requested items based at least on sending a first application programming interface (API) request using a first API associated with the first merchant inventory;
   sending, by the routing system, a first hold instruction to place a first hold on the one or more requested items with the first merchant inventory via the first API associated with the first merchant inventory;
   causing, by the routing system via the first API, the first merchant to send a second hold instruction to place a second hold on the one or more requested items with the second merchant inventory via a second API request using a second API associated with the second merchant inventory independent of generating an additional API with the second merchant inventory;
   identifying, by the routing system, the second merchant inventory is able to provide the one or more requested items based at least on the second API with the second merchant inventory;
   determining, by the routing system, a secondary marketplace network for the second merchant inventory;
   causing, by the routing system, the user device to display an indication of the second merchant inventory able to provide the one or more requested items using the secondary marketplace network; and modifying, by the routing system, one or more descriptions for the one or more requested items with the first merchant inventory and the second merchant inventory based on the modified search query and additional input received from the user device.

2. The method of claim 1, further comprising:
determining by the routing system, a third merchant inventory able to provide the one or more requested items based at least on sending a third API request using a third API associated with the third merchant inventory; and
causing by the routing system, the user device to display an indication of the third merchant inventory able to provide the one or more requested items.

3. The method of claim 1, further comprising:
in response to determining the first merchant inventory is out of the one or more requested items, searching, by the routing system, for a plurality of merchant inventories based at least on a shared catalog, and
wherein the second merchant inventory is identified based at least on searching for the plurality of merchant inventories.

4. The method of claim 3, wherein the one or more requested items corresponds with one or more identification codes, and wherein searching for the one or more requested items comprises searching with one or more search engines for the one or more identification codes.

5. The method of claim 1, further comprising:
confirming by the routing system, the one or more requested items is shipped from the second merchant inventory to a location associated with the user device based at least on use of the second API.

6. The method of claim 1, further comprising:
rating by the routing system, one or more merchants associated with the second merchant inventory based at least on the second merchant inventory shipping the one or more requested items to a location associated with the user device.

7. The method of claim 1, further comprising:
generating, by the routing system, respective API requests with the second merchant inventory and a third merchant inventory;
receiving by the routing system, respective bids from the second merchant inventory and the third merchant inventory based at least on the respective API requests;
ranking by the routing system, the second merchant inventory with the third merchant inventory based at least on the respective bids received; and
causing by the routing system, the user device to display the indication of the second merchant inventory with the third merchant inventory based at least on the ranking.

8. The method of claim 1, wherein the system routes the request for the one or more items from the first merchant inventory to the second merchant inventory using the secondary marketplace network, and wherein the secondary marketplace network identifies the one or more requested items without requiring a universal stock keeping unit (SKU), a universal product code (UPC), or an international article number (EAN).

9. A system, comprising:
a non-transitory memory; and
one or more hardware processors coupled to the non-transitory memory and configured to read instructions from the non-transitory memory to cause the system to perform operations comprising:
determining a request for one or more items generated by a user device;
generating a search query for a first merchant inventory and a second merchant inventory based on a geographic characteristic associated with the one or more requested items;
determining a language modification of the search query for each of the first merchant inventory and the second merchant inventory based on the geographic characteristic and a lexicon associated with each of the first merchant inventory and the second merchant inventory;
modifying the search query for each of the first merchant inventory and the second merchant inventory based on the language modification;
searching, by the system routing the request for the one or more requested items to a first merchant associated with the first merchant inventory and a second merchant associated with the second merchant inventory, for the one or more requested items with the first merchant inventory and the second merchant inventory based on the modified search query;
determining the first merchant inventory is out of the one or more requested items based at least on sending a first application programming interface (API) request using a first API associated with the first merchant inventory;
sending a first hold instruction to place a first hold on the one or more requested items with the first merchant inventory via the first API associated with the first merchant inventory;
causing, via the first API, the first merchant inventory to send a second hold instruction to place a second hold on the one or more requested items with the second merchant inventory via a second API request using a second API associated with the second merchant inventory independent of generating an additional API with the second merchant inventory;
identifying the second merchant inventory is able to provide the one or more requested items based at least on the second API with the second merchant inventory;
determining a secondary marketplace network for the second merchant inventory;
causing the user device to display an indication of the second merchant inventory able to provide the one or more requested items using the secondary marketplace network; and
modifying one or more descriptions for the one or more requested items with the first merchant inventory and the second merchant inventory based on the modified search query and additional input received from the user device.

10. The system of claim 9, wherein the operations further comprise:
determining a third merchant inventory able to provide the one or more requested items based at least on sending a third API request using a third API associated with the third merchant inventory; and
causing the user device to display an indication of the third merchant inventory able to provide the one or more requested items.

11. The system of claim 9, wherein the operations further comprise:
in response to determining the first merchant inventory is out of the one or more requested items, searching for a plurality of merchant inventories based at least on a shared catalog, and wherein the second merchant inventory is identified based at least on searching for the plurality of merchant inventories.

12. The system of claim 11, wherein the one or more requested items corresponds with one or more identification codes, and wherein searching for the one or more requested items comprises searching with one or more search engines for the one or more identification codes.

13. The system of claim 9, wherein the operations further comprise:
confirming the one or more requested items is shipped from the second merchant inventory to a location associated with the user device based at least on use of the second API.

14. The system of claim 9, wherein the operations further comprise:
rating one or more merchants associated with the second merchant inventory based at least on the second merchant inventory shipping the one or more requested items to a location associated with the user device.

15. The system of claim 9, wherein the operations further comprise:
generating respective API requests with the second merchant inventory and a third merchant inventory;
receiving respective bids from the second merchant inventory and the third merchant inventory based at least on the respective API requests;
ranking the second merchant inventory with the third merchant inventory based at least on the respective bids received; and
causing the user device to display the indication of the second merchant inventory with the third merchant inventory based at least on the ranking.

16. A non-transitory machine-readable medium having stored thereon machine-readable instructions executable to cause a machine to perform operations comprising:
determining a request for one or more items generated by a user device;
generating a search query for a first merchant inventory and a second merchant inventory based on a geographic characteristic associated with the one or more requested items;
determining a language modification of the search query for each of the first merchant inventory and the second merchant inventory based on the geographic characteristic and a lexicon associated with each of the first merchant inventory and the second merchant inventory;
modifying the search query for each of the first merchant inventory and the second merchant inventory based on the language modification;
searching, by a system routing the request for the one or more requested items to a first merchant associated with the first merchant inventory and a second merchant associated with the second merchant inventory, for the one or more requested items with the first merchant inventory and the second merchant inventory based on the modified search query;
determining the first merchant inventory is out of the one or more requested items based at least on sending a first application programming interface (API) request using a first API associated with the first merchant inventory;
sending a first hold instruction to place a first hold on the one or more requested items with the first merchant inventory via the first API associated with the first merchant inventory;
causing, via the first API, the first merchant inventory to send a second hold instruction to place a second hold on the one or more requested items with the second merchant inventory via a second API request using a second API associated with the second merchant inventory independent of generating an additional API with the second merchant inventory system;
identifying the second merchant inventory is able to provide the one or more requested items based at least on the second API with the second merchant inventory;
determining a secondary marketplace network for the second merchant inventory;
causing the user device to display an indication of the second merchant inventory able to provide the one or more requested items using the secondary marketplace network; and
modifying one or more descriptions for the one or more requested items with the first merchant inventory and the second merchant inventory based on the modified search query and additional input received from the user device.

17. The non-transitory machine-readable medium of claim 16, wherein the operations further comprise:
determining a third merchant inventory able to provide the one or more requested items based at least on sending a third API request using a third API associated with the third merchant inventory; and
causing the user device to display an indication of the third merchant inventory able to provide the one or more requested items.

18. The non-transitory machine-readable medium 16, wherein the operations further comprise:
in response to determining the first merchant inventory is out of the one or more requested items, searching for a plurality of merchant inventories based at least on a shared catalog, and
wherein the second merchant inventory is identified based at least on searching for the plurality of merchant inventories.

19. The non-transitory machine-readable medium 16, wherein the operations further comprise:
confirming the one or more requested items is shipped from the second merchant inventory to a location associated with the user device based at least on use of the second API.

20. The non-transitory machine-readable medium 16, wherein the operations further comprise:
rating one or more merchants associated with the second merchant inventory based at least on the second merchant inventory shipping the one or more requested items to a location associated with the user device.

\* \* \* \* \*